(12) United States Patent
Gilson

(10) Patent No.: US 7,051,185 B2
(45) Date of Patent: May 23, 2006

(54) HYPERCOMPUTER

(75) Inventor: Kent L. Gilson, Draper, UT (US)

(73) Assignee: Star Bridge Systems, Inc., Draper, UT (US)

( * ) Notice: Subject to any disclaimer, the term of this patent is extended or adjusted under 35 U.S.C. 154(b) by 0 days.

(21) Appl. No.: 10/660,855

(22) Filed: Sep. 12, 2003

(65) Prior Publication Data

US 2004/0049653 A1 Mar. 11, 2004

Related U.S. Application Data

(63) Continuation of application No. 09/539,318, filed on Mar. 30, 2000, now Pat. No. 6,622,233.

(60) Provisional application No. 60/127,232, filed on Mar. 31, 1999.

(51) Int. Cl.
*G06F 15/80* (2006.01)
(52) U.S. Cl. ...................................................... 712/11
(58) Field of Classification Search ................. 712/10, 712/11, 12, 13, 14, 15
See application file for complete search history.

(56) References Cited

U.S. PATENT DOCUMENTS

| | | | |
|---|---|---|---|
| 5,020,059 A | 5/1991 | Gorin et al. | |
| 5,361,373 A | 11/1994 | Gilson | |
| 5,471,580 A | 11/1995 | Fujiwara et al. | |
| 5,513,371 A | 4/1996 | Cypher et al. | |
| 5,600,845 A | 2/1997 | Gilson | |
| 5,661,662 A | 8/1997 | Butts et al. | |
| 5,684,980 A | 11/1997 | Casselman | |
| 5,689,661 A | 11/1997 | Hayashi et al. | |
| 5,852,740 A | 12/1998 | Estes | |
| 5,956,518 A | 9/1999 | DeHon et al. | |
| 5,960,191 A | 9/1999 | Sample et al. | |
| 6,092,174 A | 7/2000 | Roussakov | |
| 6,622,233 B1* | 9/2003 | Gilson | ......................... 712/11 |

OTHER PUBLICATIONS

Duncan A. Buell, Jeffrey M. Arnold and Walter J. Kleinfelder—Editors—Center for Computing Sciences, Bowie, Maryland, *Splash 2—FPGAs in a Custom Computing Machine*, 1996, pp. 1-45.

(Continued)

*Primary Examiner*—William M. Treat
(74) *Attorney, Agent, or Firm*—Morrison & Foerster LLP

(57) ABSTRACT

A computer system comprising a first block which includes multiple processing subsystem, a second block which includes multiple processing subsystem, a third block which includes multiple processing subsystem, a fourth block which includes multiple processing subsystem, a first communication and processing subsystem that interconnects subsystem of the first and second blocks, a second communication and processing subsystem that interconnects subsystem of the third and fourth blocks, a third communication and processing subsystem that interconnects subsystem of the first and fourth blocks; and a fourth communication and processing subsystem that interconnects subsystem of the second and third blocks, wherein respective subsystem include a respective processing elements and a respective communication and processing unit interconnecting the respective processing elements.

10 Claims, 25 Drawing Sheets

OTHER PUBLICATIONS

J. N. H. Heemskerk et al., "MindShape: a neurocomputer concept based on a fractal architecture", Proceedings of Artificial Neural Networks, Brighton, UK Sep. 4-7, 1992 vol. 2, pp. 1483-1486.

V. K. Jain, "VLSI Considerations for TESH: A New Hierarchical Interconnection Network for 3-D Integration", IEEE vol. 6, No. 3, Sep. 1998, pp. 346-353.

Lauwerier, "Fractals Endlessly Repeated Geometrical Figures", Princeton Univ. Press, N.J. (1991), pp. XI-IVX, 1-2.

Schroeder, "Fractals, Chaos, Power Laws", W.H. Freeman and Co. N.Y. (1991), p. XII.

Villasenor et al., "Configurable Computing", (1997), Scientific American, pp. 66-71.

* cited by examiner

[0] - [63] : PROCESSORS (NUMBERS REPRESENT LOGICAL ID)

⊞ :THROUGH SWITCH

⊞ :TURN SWITCH

HYPERCOMPUTER

CROSS-REFERENCE TO RELATED APPLICATIONS

This application is a continuation of application Ser. No. 09/539,318, filed Mar. 30, 2000 now U.S. Pat. No. 6,622,233, which claims priority of Application No. 60/127,232, filed Mar. 31, 1999, the entire content of which is incorporated herein by reference.

BACKGROUND OF THE INVENTION

1. Field of the Invention

The invention relates to (re)configurable computing systems.

2. Description of the Related Art

Introduction

Villasenor and Magnione, Configurable Computing, Scientific American, June 1997, pages 66–71, describe the new era of computer design opened by computers that modify their hardware circuits as they operate. Configurable computing architectures combine elements of general-purpose computing and application-specific integrated circuits (ASICs). The general-purpose processor operates on fixed circuits that perform multiple tasks under software control. An ASIC contains circuits specialized to a particular task and often needs little or no software to instruct it. In a configurable computer, software commands can alter field programmable gate array (FPGA) circuits as needed to perform a changing variety of tasks.

The promise of configurable circuits is versatile configuration for optimal performance of very specific tasks. On the one hand, a configurable computer often is more versatile than a special purpose device such as an ASIC which may not be configurable to perform a wide range of tasks. On the other hand, a configurable computer, or perhaps an array of programmable elements, often can be configured to perform specialized functions faster than a general purpose processor. A configurable computer can be optimally configured for the task at hand; whereas a general purpose processor suited to a wide variety often may not be optimized for a particular task.

U.S. Pat. Nos. 5,361,373 and 5,600,845, both issued to Gilson, entitled INTEGRATED CIRCUIT COMPUTING DEVICE COMPRISING DYNAMICALLY, CONFIGURABLE GATE ARRAY HAVING A MICROPROCESSOR AND RECONFIGURABLE INSTRUCTION EXECUTION MEANS AND METHOD THEREFOR, discloses an integrated circuit computing device comprised of a dynamically configurable Filed programmable Gate Array (FPGA). This gate array is configured to implement a RISC processor and a Reconfigurable Instruction Execution Unit.

The Challenge of Reconfigurable Communications Among (Re)Configurable Processing Elements An important challenge in the development of computer systems in general, and in (re)configurable computing systems in particular, is communication among processing elements (e.g., FPGAs) that comprise the system. The ability to reconfigure processing elements to perform different tasks generally requires the ability to also (re)configure communication among processing elements to meet the needs of the task at hand. The following patents illustrate just a few prior solutions to the problem of reconfiguring communication among reconfigurable processing elements.

U.S. Pat. No. 5,020,059, issued to Gorin et al., entitled RECONFIGURABLE SIGNAL PROCESSOR, discloses an interconnection scheme among processing elements (PEs) of a multiprocessor computing architecture; and means utilizing the unique interconnections for realizing, through PE reconfiguration, both fault tolerance and a wide variety of different overall topologies including binary trees and linear systolic arrays. (See Abstract) The reconfigurability allows many alternative PE network topologies to be grown or embedded in a PE lattice having identified PE or inter-PE connection faults. In one embodiment, 4-port PEs are arrayed in a square 4×4 rectangular lattice which constitutes a basic 16-PE module. In one embodiment, each PE includes a digital signal processor, a memory and a configuration network. Each PE has four physical ports which connect to similar ports of its neighbors. For tree topologies, any of the four neighbors of a given PE may be selected as the parent of the given PE; and any or all of the remaining three neighboring PEs may be selected as the child(ren) PEs. (Column 2, lines 56–64) The functionality of the ports of each PE, which define the neighbor relations, may be controlled by instructions from an exterior source, such as a Host computer. The process of routing among ports within each PE may be software defined. By using a variant of a tree expansion scheme, the processor allows for virtually arbitrary up-sizing of the PE count to build virtually any size of tree network, with each size exhibiting the same degree of fault tolerance and reconfigurability. (Column 3, lines 5–14)

Gorin et al. assert that, importantly, their processor retains a logarithmic communications radius and uses identical and scale-invariant modules to grow. A property related to scale, is fast communications between a Host computer and the PE array. (Column 7, lines 22–24) PE configurations assembled as a binary tree, for example, have the advantageous property that if the number of PEs in the array are doubled, the layers through which communications must pass, increase by only one. This property, known as logarithmic communications radius, is desirable for large-scale PE arrays since it adds the least additional process time for initiating communications between Host and PEs. Salability is served by devising a single, basic PE port configuration as well as a basic module of board-mounted PEs, to realize any arbitrary number of PEs in an array. (Column 1, line 61–Column 2, line 4)

Gorin et al. also teaches a system comprising multiple printed circuit boards each mounted with 16 PEs. Each PE of the board has four ports. Two of the ports in each of the corner PEs in the lattice are available to effect communications external to the board. Further, each PE port communicates with one of the ports in the nearest neighbor PE. FIG. 1, which is from the Gorin et al. patent, shows three PE boards 1, 2 and 3 with the port-to-port PE connections for a tree lattice structure. The PEs are shown not in their fixed lattice structure, but in the actual tree geometry for data flow, which can be created by configuring the PE ports. (Column 10, line 64–Column 11, line 9)

U.S. Pat. No. 5,513,371 issued to Cypher et al., entitled HIERARCHICAL INTERCONNECTION NETWORK ARCHITECTURE FOR PARALLEL PROCESSING, HAVING INTERCONNECTIONS BETWEEN BIT-ADDRESSABLE NODES BASED ON ADDRESS BIT PERMUTATIONS, describes two new classes of interconnection networks referred to as hierarchical shuffle-exchange (HSE) and hierarchical de Bruijn (HdB) networks. The new HSE and HdB networks are highly regular and scalable and are thus very well suited to VLSI implementation. These networks are efficient in supporting the execution of a wide range of algorithms on computers whose processors are interconnected via an HSE or HdB network. (Abstract) FIG. 2, which is from the Cypher et al. patent, depicts an illustrative drawing of a two level HSE computer including 8 processors interconnected via an HSE network. FIG. 3, which is from the Cypher et al. patent, depicts an illustrative drawing of a two level HdB computer including 8 processors interconnected via an HdB network. Each level of an HSE or HdB hierarchy corresponds to a level of packaging (e.g., the chip level, the board level, or the rack level). Their hierarchical nature allows them to be partitioned into a number of identical components (chips, boards, racks, etc.). The design of these components does not depend on the number of processors in the parallel machine, so they can be combined to form arbitrarily large networks. Also, because each level of the hierarchy corresponds to a level of packaging, the widths of the connections at each level of the hierarchy can be matched to the constraints imposed by the corresponding level of packaging. As a result, these networks are efficient in implementing a wide range of algorithms. (Column 6, lines 32–44)

U.S. Pat. No. 5,661,662 issued to Butts et al., entitled STRUCTURES AND METHODS FOR ADDING STIMULUS AND RESPONSE FUNCTIONS TO A CIRCUIT DESIGN UNDERGOING EMULATION, discloses a plurality of electronically reconfigurable gate array logic chips interconnected via a reconfigurable interconnect, and electronic representations of large digital networks that are converted to take temporary operating hardware form on the interconnected chips. The reconfigurable interconnect permits the digital interconnect permits the digital network realized on the interconnected chips to be changed at will, making the system well suited for a variety of purposes including simulation, prototyping, execution and computing. FIGS. 4–4A, which are from the Butts et al patent, are schematic block diagrams of a cross-bar interconnect system disclosed by Butts et al.

U.S. Pat. No. 5,684,980 issued to Casselman, entitled FPGA VIRTUAL COMPUTER FOR EXECUTING A SEQUENCE OF PROGRAM INSTRUCTIONS BY SUCCESSIVELY RECONFIGURING A GROUP OF FPGA IN RESPONSE TO THOSE INSTRUCTIONS, discloses an array of FPGAs whose configurations change successively during performance of successive algorithms or instruction, in a manner of a computer executing successive instructions. In one aspect of the Casselman invention, adjacent FPGAs in the array are connected through external field programmable interconnection devices or cross-bar switches in order to relieve the internal resources of the FPGAs from any external connection tasks. This solved a perceived problem of having to employ 90% of the internal FPGA resources on external interconnection.

U.S. Pat. No. 5,689,661 issued to Hayashi et al., entitled RECONFIGURABLE TORUS NETWORK HAVING SWITCHES BETWEEN ALL ADJACENT PROCESSOR ELEMENTS FOR STATICALLY OR DYNAMICALLY SPLITTING THE NETWORK INTO A PLURALITY OF SUBSYSTEMS, discloses an n-dimensional torus-based parallel computer, n being an integer greater than 1, that is folded n times with the results of the folding embedded in an n-dimensional layer for connection with an interleave connecting unit. Four terminal switches or switch units are placed at folding positions. The switching units are changed so that any two of the four terminals are linked together. This permits the torus network to be split into subtorus networks or subtori. The subtori can be integrated into the original torus network whereby the reconfiguration of the torus network is realized. (Abstract) FIG. 5, which is from the Hayashi et al. patent, illustrates an embodiment of two-dimensional reconfigurable torus networks, which comprises 16×16 processors. (Column 6, lines 15–17)

U.S. Pat. No. 5,852,740 issued to Estes, entitled POLYMORPHIC NETWORK METHOD AND APPARATUS, depicts a modular polymorphic network interconnecting a plurality of electronically reconfigurable devices via a modular, polymorphic interconnect, to permit a fixed physical configuration of operating hardware devices to take on a plurality of logically addressable configurations. The modular polymorphic interconnect additionally permits the logical topology of selected electronically reconfigurable devices to be configured as at least one mixed-radix N-dimensional network. (Abstract) FIG. 6, which is from the Estes patent, shows a sixteen valued, mixed-radix 3-dimensional object name space 1407 disclosed in the Estes patent. (Column 20, lines 48–50) FIG. 7, which is from the Estes patent, illustrates a polymorphic interconnection network module for concurrent multiple element selection disclosed in the Estes patent. (Column 24, lines 17–19)

U.S. Pat. No. 5,956,518 issued to DeHon et al., entitled INTERMEDIATE-GRAIN RECONFIGURABLE PROCESSING DEVICE, discloses a programmable integrated circuit which utilizes a large number of intermediate-grain processing elements which are multibit processing elements arranged in a configurable mesh. (Abstract) Configuration control data defines data paths through the interconnect, which can be address inputs to memories, data inputs to memories and logic units, and instruction inputs to logic units. Thus, the interconnect is configurable to define an interdependent functionality of the functional units. A programmable configuration storage stores the reconfiguration data. (Column 2, lines 22–28)

DeHon et al. disclose a basic functional unit (BFU) that includes a core with a memory block, ALU core and configuration memory. (Column 5, lines 58–60) Several example configurations of the device are disclosed. There is a disclosure of the device operative as a single instruction multiple data (SIMD) system that is reconfigurable on a cycle-by-cycle basis. There is a disclosure of the device configured as a 32-bit wide microprocessor. There is a disclosure of the device configured as a multiple instruction multiple data (MIMD) system. There is a disclosure of the device configured as a very long instruction word (VLIW) system. (Column 5, lines 24–56) There is a disclosure of various convolution configurations. (Columns 16–28)

DeHon et al disclose a network that joins the BFU cores into a complete array that comprises a three-level interconnect structure, incorporating regular neighbor mesh, longer switchable lines, and long broadcast lines. (Column 8, lines 18–21) In the level-1 shown in FIG. 8, which is from the DeHon et al. patent, network structure, the output of every BFU core is passed to its nearest neighbors in all directions. (Column 8, lines 23–25) In the level-2 network structure, shown in FIG. 9, which is from the DeHon et al. patent, length-4 broadcast lines are provided between rows and columns of cells containing a 5×5 array of BFUs. (Column 8, lines 33–34) In the level-3 network structure, 4 shared network lines span every row and column. Each BFU gets to drive up to 4 inputs onto the level-3 network. In addition, every BFU has access to every level-3 line crossing it. (Column 8, lines 58–60)

U.S. Pat. No. 5,960,191 issued to Sample et al., entitled EMULATION SYSTEM WITH TIME MULTIPLEXED INTERCONNECT, discloses a hardware emulation system which reduces hardware cost by time-multiplexing multiple design signals onto physical logic chip pins and printed circuit board. FIG. 10, which is from the Sample et al. patent, shows a block diagram of a partial crossbar network incorporating time-multiplexing disclosed by Sample et al.

Scaling Self-Similarity and Fractals

The term fractal was originally derived from the concept of "fractal dimension" by Benoit Mandelbrot who showed how fractals can occur in many places both in mathematics and in nature. The Latin fractus means broken.

Hans Lauwerier in Fractals, Endlessly Repeated Geometric Figures, Princeton University Press, Princeton, N.J., 1991, describes fractals as follows in the introduction to his book.

"A fractal is a geometric figure in which an identical motif repeats itself on an ever diminishing scale." (Page xi)

He goes on to state that,

"Fractals are characterized by a kind of built-in self-similarity in which a figure, a motif, keeps repeating itself on an ever-diminishing scale. A good example is a tree with a trunk that separates into two branches, which in turn separate into two smaller side branches, and so on. The final result is a tree fractal with an infinite number of branches; each individual branch, however small, can in turn be regarded as a small trunk that carries an entire tree." (Page xii)

He asserts that,

"The concept 'fractal' has already proved its use in many applied fields. There one often feels the need to extend the concept of similarity of some degree by introducing small changes to the series of similarity transformations, so called disturbances. If we introduce chance disturbances into a mathematically regular tree fractal the result may look like a real tree, coral or sponge." (Page xiii)

One example of a fractal is the "H-Fractal" illustrated in FIG. 11. (from Lauwerier, page 2, FIG. 1). According to Lauwerier, "A fractal is a geometrical figure that consists of an identical motif repeating itself on an ever-reducing scale. A good example is the H-fractal . . . . Here the capital H is the repeating motif. The H-fractal is built up step by step out of a horizontal line-segment . . . taken to be of unit length. At the first step two line segments are placed perpendicularly at the ends of the original one . . . "[A] reduction factor of [1/(2)1/2] has been chosen. At the second step, shorter horizontal line-segments are fastened on to the four end-points in the same way. The same reduction factor makes the lengths of these half a unit. We continue like this for a long time." (Page 1)

There are those who perceive self-similarity as a fundamental principle of nature. Manfred Schroeder in Fractals, Chaos, Power Laws, W. H. Freeman and Company, New York, 1991, at page xii, offers a sweeping statement of the prevalence of self-similarity in nature.

"The unifying theory underlying fractals, chaos and power laws is self-similarity. Self-similarity, or invariance against changes in scale or size, is an attribute of many laws of nature and innumerable phenomena in the world around us. Self-similarity is, in fact. one of the decisive symmetries that shape our universe and our efforts to comprehend it."

Conclusion

Despite advances in reconfigurable communications among processing elements in reconfigurable computer systems, there continues to be a need for improvements in the interplay between reconfigurable processing elements and reconfigurable communication resources that interconnect such processing elements. There also exists a need to effectively apply the characteristics of fractals, which are ubiquitous in nature, to the design of computer systems. That is, there is a need for an improved computer system which exhibits fractal-like qualities, namely a meaningful degree of self-similarity on reducing scale, like the self-similarity that is manifest in nature. The present invention meets these needs.

SUMMARY OF THE INVENTION

A computer system is provided which includes: a first block which includes multiple processing subsystems; a second block which includes multiple processing subsystems; a third block which includes multiple processing subsystems; and a fourth block which includes multiple processing subsystems. A first communication and processing subsystem interconnects subsystems of the first and second blocks. A second communication and processing subsystem interconnects subsystems of the third and fourth blocks. A third communication and processing subsystem interconnects subsystems of the first and fourth blocks. A fourth communication and processing subsystem interconnects subsystems of the second and third blocks. Respective subsystems include a respective processing elements a respective communication and processing unit interconnecting the respective elements.

In one aspect, a present embodiment of the invention exhibits a fractal-like scaling of processing resources and communication resources. In one embodiment, a system architecture comprising processing element subsystems features a motif in which a ratio of approximately four processing resources to one communication resource repeats itself on a diminishing scale as the view of the system progresses from level three to level two. It will be appreciated from the TABLE below, that block 164 (and each of blocks 178, 192 and 194 of FIGS. 17–22) comprises thirty-two PEs that are interconnected via A and B intra-connection lines. The respective thirty-two processing unit PEs of respective blocks 164, 178, 192 and 194 are connected to respective networks of four PEs (i.e., 118-1, 116-9, 188-1, 188-2, 190-1, 190-2). In addition, each respective block comprises four respective communication and processing units for a total of approximately eight communication and processing units per block. Thus, for level three there is an ratio of processing resources to communication resources of approximately 4-to-1. It will be further appreciated from the TABLE below that, as shown in FIG. 13, Level Two processing unit 116 with its four PEs 100-1 to 100-4 is connected to a one Level Two Communication and Processing Unit 120. Moreover, every respective one of the thirty-two Level Two Processing Units in the system of a present embodiment has a similar 4-to-1 ratio between the number of processing unit PEs and the number of communications and processing units. Thus, consistent with fractals in nature, the motif of the present embodiment maintains a significant degree of self-similarity with respect to the ratio of processing resources to compute resources in moving from the level three to the level two views of the system.

|  | Scaling Processing Resources | Scaling Communication Resources |
| --- | --- | --- |
| Level 1 | four internal processing element regions within each PE (e.g., regions 104-1 to 104-4 of PE 100 of FIG. 12) | one PE and its intra-connection lines (e.g., PE 120 plus "A" intra-connection lines 122 and "B" intra-connection lines 128, 130 of FIG. |

-continued

| | Scaling Processing Resources | Scaling Communication Resources |
|---|---|---|
| | | 13) |
| Level 2 | four PEs comprising one-half of a Level Two Subsystem (e.g., PEs 100-1 through 100-4 of Level Two Processing unit 116 of FIG. 13 | one communication PE (e.g., communication PE 120 plus "A" connection lines 122 and "B" connection lines 128, 130 of FIG. 13) |
| Level 3 | thirty-two processing PEs comprising one block of Level Two Subsystems (e.g., PEs 116-1 to 116-4 and 118-1 to 118-4 of block 164 of FIGS. 16–17) | eight communication PEs comprising one-half of a Level Two Subsystem networked together by the "A" intra-connection lines that interconnect such four PEs (e.g., PEs 182-1 through 182-4 of Level Two Processing and Communication unit 116-9 of FIGS. 17–18 plus the respective Level Two Communication and Processing units 166-9, 168-9, 170-9 and 172-9 of block 164) |

In another aspect of the invention, it will be appreciated that the hierarchy levels of a present embodiment of the invention overlap. Thus, there is no rigid hierarchy. For instance, processing element 182-1 of FIG. 17 is simultaneously a level one processing element and a level two processing element as part of the level two processing unit 116-9 and a level three communication and processing unit because of its connection with communication and processing unit 180-9. Similarly, for example, processing element 180-9 of FIG. 17 is simultaneously a level one processing element and a level two communication and processing element as part of Level Two Subsystem 114-8 and a level three communication and processing element due to its connection to processing element 182-1. Thus, for example, as with a naturally occurring tree fractal in which a branch can be a trunk and a branch simultaneously, a communication processing element of a present embodiment can simultaneously serve as part of the communication fabric of multiple levels of system hierarchy.

The scaling of processing resources with communication resources so that a ratio of processing resources to communication resources remains approximately constant from one level of the system hierarchy to the next has important ramifications. For instance, there are likely to be fewer deleted neighborhoods in a given style of processing architecture created by configuring the system. Moreover, there is more likely to be a continuous function that can be used to describe virtually all permutations of a processing architecture. As a result, the present system may, in effect, constitute a continuous compute substrate that can amalgamate an arbitrary algorithm with the hardware used to process the algorithm.

These and other features and advantages of the invention will be better appreciated from the following detailed description of the a preferred embodiment of the invention together with the drawings.

DETAILED DESCRIPTION OF THE PREFERRED EMBODIMENT

The following description is presented to enable any person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art would realize that the invention may be practiced without the use of these specific details. In other instances, well-known structures and devices are shown in block diagram form in order not to obscure the description of the invention with unnecessary detail. Thus, the present invention is not intended to be limited to the embodiment shown, but is to be accorded the widest scope consistent with the principles and features disclosed herein.

Figure 12:
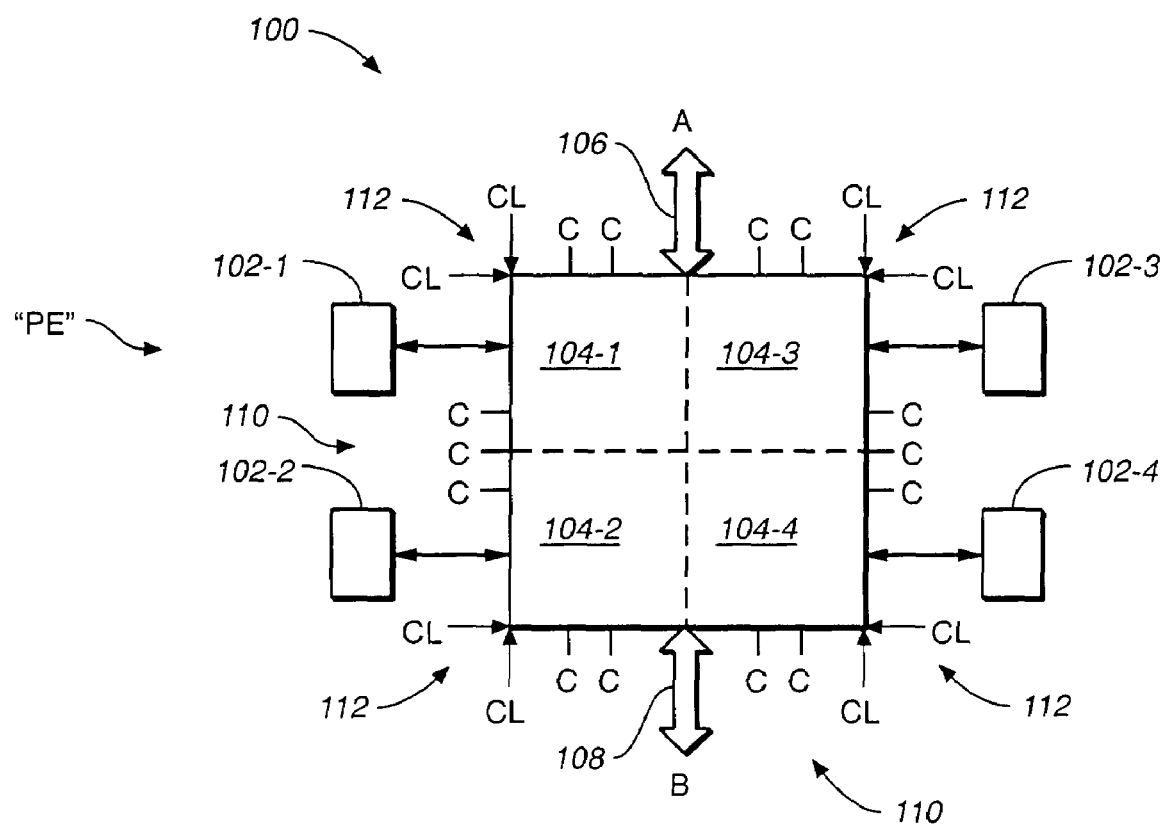
FIG. 12 provides an illustrative drawing of a processing element of connected with memory resources in accordance with a presently preferred embodiment of the invention.

Referring to the illustrative drawing of FIG. 12 there is shown a processing element of 100 connected with memory resources 102-1 through 102-4. The processing element includes a multiplicity of external connection pins about its perimeter as shown.

The intersecting dashed lines demarcate in conceptual terms four different regions 104-1 through 104-4 of the processing element 100. Each of the memory resources 102-1 through 102-4 is interconnected with processing element pins adjacent to a corresponding processing element region. For instance, memory resource 102-1 is interconnected with pins that carry address, data, and control information between memory resource 102-1 and the processing element 100. Moreover, memory resource 102-1 is interconnected with the processing element 100 through pins adjacent to processing element region 104-1. Similarly, memory resource 102-1 is interconnected to processing element 100 by pins adjacent to processing element region 104-2. Memory resource 102-3 is interconnected to processing element 100 by pins adjacent to processing element region 104-3. Memory resource 102-4 is interconnected to processing element 100 by pins adjacent to processing element region 104-4.

A first set of external connection pins generally disposed about a first side of the processing element 100 are grouped together. This first group shall be referred to herein as the Group A Connections 106. A second group of external connection pins generally disposed along a second side of the processing element 100 are grouped together as a second group which shall be referred to herein as the Group B Connections 108. The Group A Connections 106 and the Group B Connections 108 are generally disposed along opposite sides of the processing element. A third group of external connection pins is distributed about the periphery of the processing element. This third group shall be referred to herein as the Group C Connections 110. The Group A, B and C external pin connections are labeled accordingly in FIG. 12. The large arrows associated with the Group A and B connections are intended to indicate that each of these are generally disposed as a group along opposite sides of the processing element 100. Clock signal external connections CL can be provided to external connection pins disposed near the four corners of the processing element 100.

In a presently preferred embodiment of the invention, the processing element 100 comprises a field programmable gate array (FPGA), and the memory resources 102-1 through 102-4 comprise dynamic random access memory. More specifically in a current implementation, the processing element 100 is a 4062 FPGA produced Xilinx, Inc. having offices in San Jose, Calif. Moreover, in a current implementation, the memory resources 102-1 through 102-4 comprise four 8 nanosecond SDRAMs.

An FPGA device comprises hardware resources that can be configured to perform the functions required by virtually any application. For example, FPGAs produced by Xilinx, Inc. comprise combination logic blocks (CLB) resources that can be configured to perform different functions. FPGAs produced by National Semiconductor Corporation, for example, include "cells" that can be configured to perform different functions. Similarly, FPGAs produced by Altera, Inc. include logic array blocks (LABs) that can be configured to perform different functions. These are just a few examples of different types of FPGAs.

Although the presently preferred embodiment employs FPGAs to serve as processing elements, it will be appreciated that different types of processing elements may be employed consistent with the invention. To some extend the difference between a memory, an FPGA and a processor is a matter of degree of granularity of information processing. A memory can be used to store, or to assign, a value for a single bit of information. A computation unit (e.g. CLB, Cell, LAB) of an FPGA typically operates on a few bits of information at a time. A processor ALU may operate on more bits at a time. Of course, there is no clear line to be drawn between a memory, an FPGA or a processor. For instance, an FPGA may employ lookup table memory to implement a compute function. A processor may be programmed to operate on one or two bit wide data.

A processor, for example, is quite effective at what might be termed sequence division multiplexed operations. Basically, a series of instructions cause the processor to change the state of the processor system from time to time so that the processor compute resources can be re-used by different instructions. Thus, as a sequence of instructions are provided to the processor, and the processors' state changes so that the same processor hardware can be re-used to perform different functions.

An FPGA-type processing element might, from time to time be configured to operate as a non-multiplexed device. That is, it may be configured so that the compute resources do not change state. That same processing element, later might be reconfigured so as to operate more like a processor in which compute resources change state so that they can be multiplexed and re-used for a variety of different functions.

An FPGA may be viewed as being somewhat intermediate between a memory and a processor. It has relatively fine grain processing units, such as a Xilinx CLB, a National Semiconductor cell or an Altera LAB. There are, of course, other FPGA implementations with different types of basic computation units. These compute units are relatively fine grained. However, depending upon the particular compute needs, processing elements comprising more complex compute units could be developed and used consistent with the invention.

In the future, it is foreseeable that processors and more powerful memory will be built directly into an FPGA-like device. The combination of functional units built into such a device (e.g., memory, FPGA, processor) will depend upon the nature of the application that such a device is intended to serve.

Thus, although the present embodiment of the invention employs FPGAs as processing elements, it will be appreciated that the role of the processing element may be performed by different types of devices. For instance, the assignment of a value to a pin location on the device might best be performed by a memory. The transport of information from one location to another, for example, might best be performed by a combination of integrated circuit pins and perhaps a field programmable interconnect device like a cross-point switch. Moreover, for example, depending upon the level of granularity of information that is to be processed, an FPGA with basic programming units (e.g. CLBs, cells, LABs etc.), a processor or even an application specific integrated circuit (ASIC) might be the best choice. As future devices develop, it would not be surprising to find many of these capabilities integrated into a single device.

Figure 13:
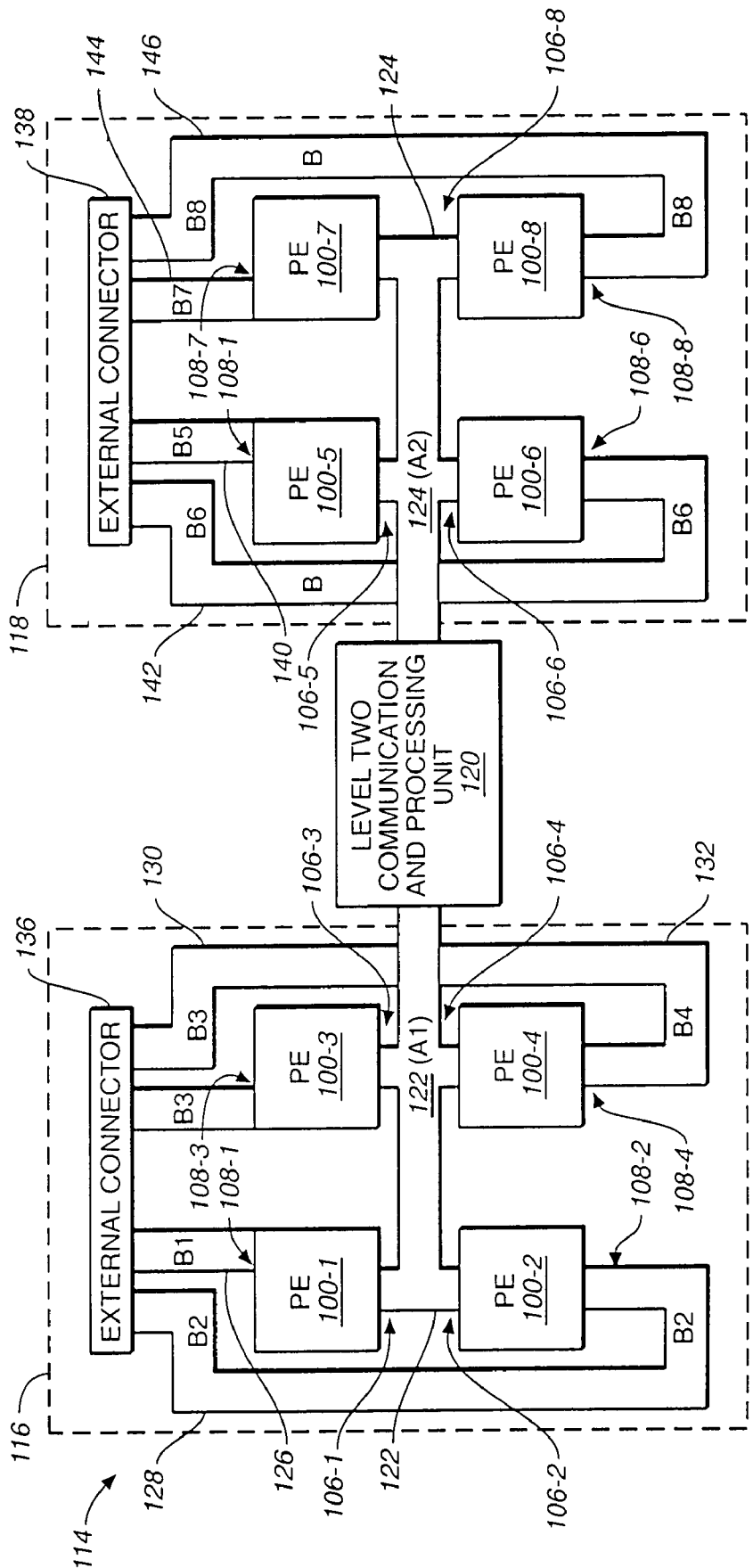
FIG. 13 is an illustrative block diagram of a Level Two Subsystem in accordance with a presently preferred embodiment of the invention.

The illustrative drawings of FIG. 13 show a block diagram of a Level Two Subsystem 114 in accordance with a presently preferred embodiment of the invention. The Level Two Subsystem 114 comprises a first Level Two processing unit 116, a second Level Two processing unit 118 and a Level Two communication and processing unit 120. The first Level Two processing unit 116 comprises a network of processing elements like processing element 100 of FIG. 12. More specifically, the first Level Two processing unit 116 includes processing elements 100-1 through 100-4. Each of these processing elements is interconnected with memory resources like the interconnection of memory resources 102-1 through 102-4 with processing element 100 as shown in FIG. 12. Similarly, the second Level Two processing unit 118 comprises a network of processing elements 100-5 through 100-8. The group A external connections of each of the processing elements 100-1 through 100-4 of the first Level Two processing unit 116 are interconnected with a first Level Two intra-connection lines (A-1) 122 which interconnect processing elements 100-1 through 100-4 and the communication and processing unit 120. More particularly, processing element 100-1 includes Group A external connections 106-1 that are interconnected with the first Level Two intra-connection lines 122. Similarly, processing elements 100-2 through 100-4 include respective Group A connections 106-2 through 106-4 that are interconnected with the first Level Two intra-connection lines 122. Likewise, a second Level Two intra-connection lines 124 (A2) interconnect the Group A external connections of processing elements 100-5 through 100-8 with the communications and processing unit 120. More specifically, the respective Group A external connections 106-5 of processing element 100-5 are interconnected with the second Level Two intra-connection lines 124 (A2). Similarly, the respective Group A connections 106-6 through 106-8 of respective processing elements 100-6 through 100-8 are interconnected with the second Level Two intra-connection lines 124.

The processing elements 100-1 through 100-4 of the first Level Two processing unit 116 and the processing units 100-5 through 100-8 of the second Level Two processing unit 118 have their respective group B external connections capable of communication external to the Level Two subsystem 114. More specifically, the group B connections 108-1 of processing element 100-1 interconnect with first Level Two processing unit external connection lines (B1) 126. Similarly, the respective group B external connections 108-2 through 108-4 of respective processing elements 100-2 through 100-4 interconnect with respective second, third and fourth Level Two processing unit external connection lines (B2, B3, B4) 128, 130, 132. Each of the first, second, third and fourth first Level Two processing unit external connection lines 126–134 communicates with a first external connector 136 which provides communication external to the Level Two Subsystem 114.

The processing elements 100-5 through 100-8 of the second Level Two processing unit 118 are similarly interconnected through a second external connector 138 for communication external to the Level Two Subsystem 114. More specifically, the Group B connections 108-5 of processing element 100-5 interconnect with first and second Level Two processing unit external connection lines (B5) 140. Likewise, the respective group B connections 108-6 through 108-8 of processing elements 100-6 through 100-8 respectively interconnect with second, third and fourth second Level Two processing unit external connection lines (B6, B7, B8) 142, 144, 146. The first, second, third and fourth second Level Two processing unit external connections lines 140–146 interconnect with the second external connector 138 to provide communication external to the Level Two Subsystem 114.

Figure 14:
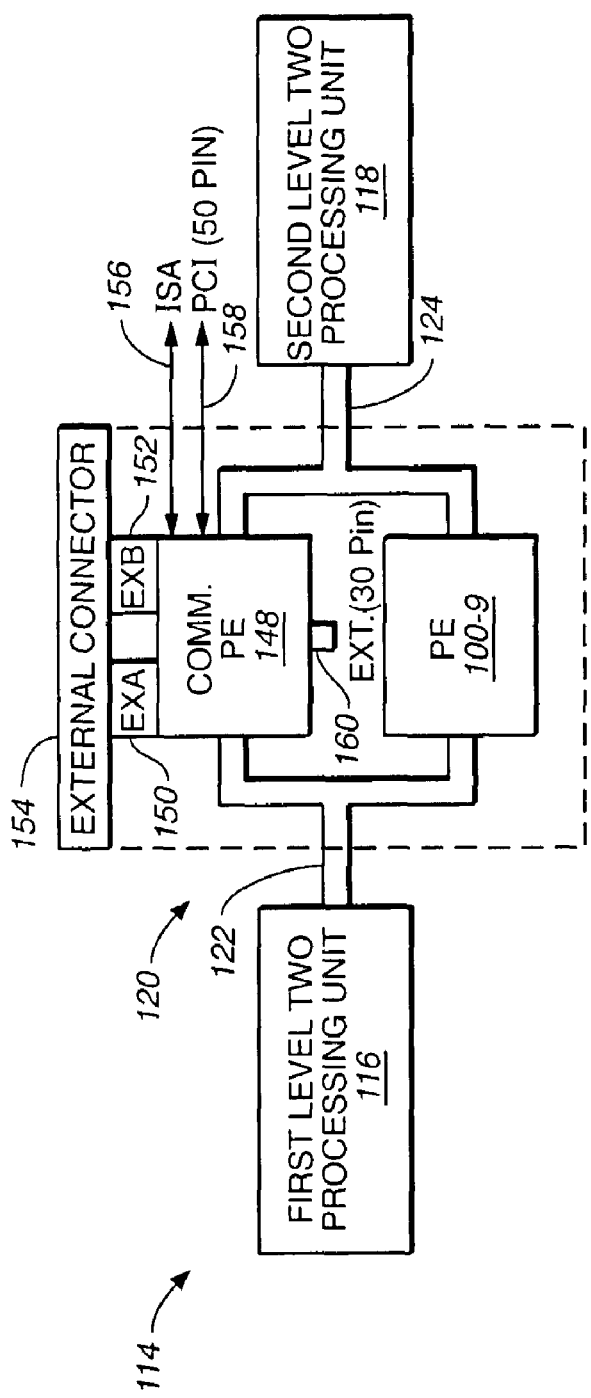
FIG. 14 is another block diagram of the Level Two Subsystem of FIG. 13 in accordance with a presently preferred embodiment of the invention.

The illustrative drawings of FIG. 14 provide another block diagram of the Level Two Subsystem 114 of FIG. 13. In FIG. 14, additional details of the Level Two communication and processing unit 120 are shown, but details of the first Level Two processing unit 116 and the second Level Two processing unit 118 are not shown. The Level Two communications and processing unit 120 is shown within dashed lines. It includes a processing element 100-9 which is identical to processing elements 100-1 through 100-8. Processing element 100-9 includes memory resources like those illustrated for processing element 100 described in FIG. 12. Although these memory resources are not shown in FIG. 14. The Level Two communication and processing unit 120 also includes a communication processing element 148 which is similar to processing elements 100-8 through 100-9. Communication processing element 148, however, in a present embodiment includes more external communication pins (not shown) than any of the individual processing elements 100-1 through 100-9. Moreover, communications processing element 148 in a presently preferred embodiment does not include memory resources like those associated with each of the other processing elements 100-1 through 100-9. More specifically, processing elements 100-1 through 100-9 and processing element 148 all are implemented as Xilinx 4062 FPGAs in a present embodiment. However, communication processing element 148 employs a higher pin count (438) BGA package. The communication processing element 148 with its higher pin count can be more readily employed as a cross-point switch, for example. Heat dissipation issues prevented the use of such higher pin count packages by the other Xilinx 4062 FPGAs.

The first Level Two intra-connection lines (A1) 122 interconnect with external connection pins of both the PE 100-9 and the communications PE 148. Similarly, the second Level Two intra-connection lines (A2) 124 interconnect with the external connection pins of PE 100-9 and communication PE 148. In addition, a first group of external connection pins of the communication PE 148 interconnect with a group of EXA lines 150. Another group of external connections pines of the communication PE 148 interconnect with a group of EXB lines 152. The EXA lines 150 and the EXB lines 152 provide communication external to the Level Two Subsystem 114 through third external connector 154. Another collection of external connection pins of the communication PE 148 are allocated for use by an ISA style bus 156. Yet another collection of external connection pins of the communication PE 148 are allocated for use by a PCI style bus 158. Finally, still another collection of external connection pins 168 of the communication PE 148 is allocated for still further communication external to the Level Two Subsystem 114.

Figure 15:
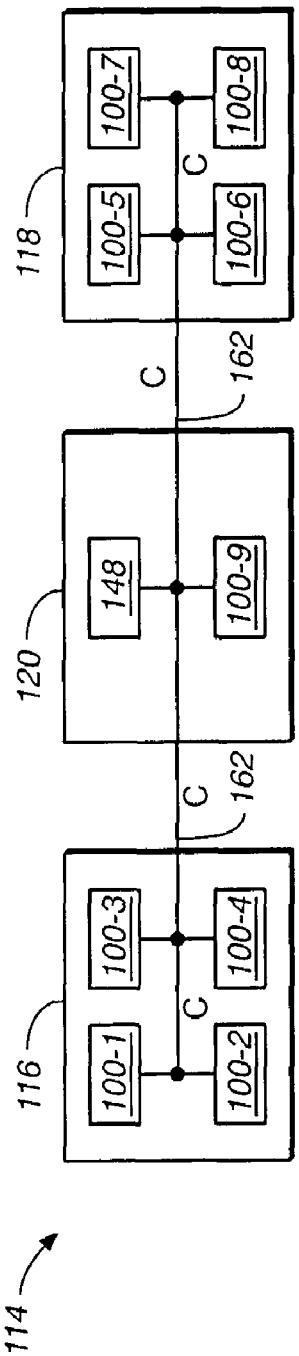
FIG. 15 is another greatly simplified block diagram of the Level Two Subsystem of FIGS. 13–14 in accordance with a presently preferred embodiment of the invention.

The illustrative block diagram of FIG. 15 provides a greatly simplified block diagram view of the Level Two Subsystem 114 of FIGS. 13 and 14. FIG. 15 shows in general terms the interconnection of each of the processing elements 100-1 through 100-9 and the communications processing element 148 via a third Level Two intra-connection lines 162. The respective group C external connection pins of each of processing elements 100-1 through 100-9 and communication processing element 148 interconnect with the third Level Two intra-connection lines.

The intra-connection lines 162, for example, are particularly useful for broadcasting information to all of the processing elements of a communication and processing unit 21. Such a broadcast of information might, for instance, be useful when the same data is to be used by all of the processing elements.

An advantage of a communication and processing unit like that of FIGS. 13–15 is that there is an approximate balance in which there can be linear scaling of communications capability, compute capability and granularity of compute resources so that linear scaling of each can enable an overall system comprising many elements of the general type described in reference to FIGS. 13–15 to meet the communications, compute and granularity demands of increasingly complex algorithms. More specifically, the first and second intra-connection lines 122, 124 provide a two dimensional communication path between processing elements 100-1 through 100-9 and communication processing element 148. As explained more fully below, first through fourth, first Level Two processing unit external connection lines 126 through 132 and first through fourth, second Level Two processing unit external connections lines 140 through 146 permit external communication with other communication and processing units like that disclosed in FIGS. 13–15, and these other communication and processing elements may be disposed in a third dimension.

In other words, these other communication and processing units may be disposed above or below communication and processing unit 120 described in FIGS. 13–15. The ability to stack communication and processing units in three dimensions can reduce the distance between adjacent processing elements. As a result, the time required to communicate information between different communication and processing elements can be reduced. By providing many intra-connection lines and many external connection lines there can be a relatively high volume of communication between processing elements.

Moreover, this high volume of communication makes possible the improved cooperation among processing elements in performing a computation task. Moreover, as explained more fully below, the large amount of interconnection resources (e.g. connections 122, 124 and connections 126–132 and connections 140–146) and other interconnections defined elsewhere herein permit the scaling up of the basic architecture of the communication and processing unit of FIGS. 13–15 to a much larger scale which, in turn, permits higher granularity (i.e., more bits of information to be processed together) so that more complex operations can be performed efficiently.

Figure 17:
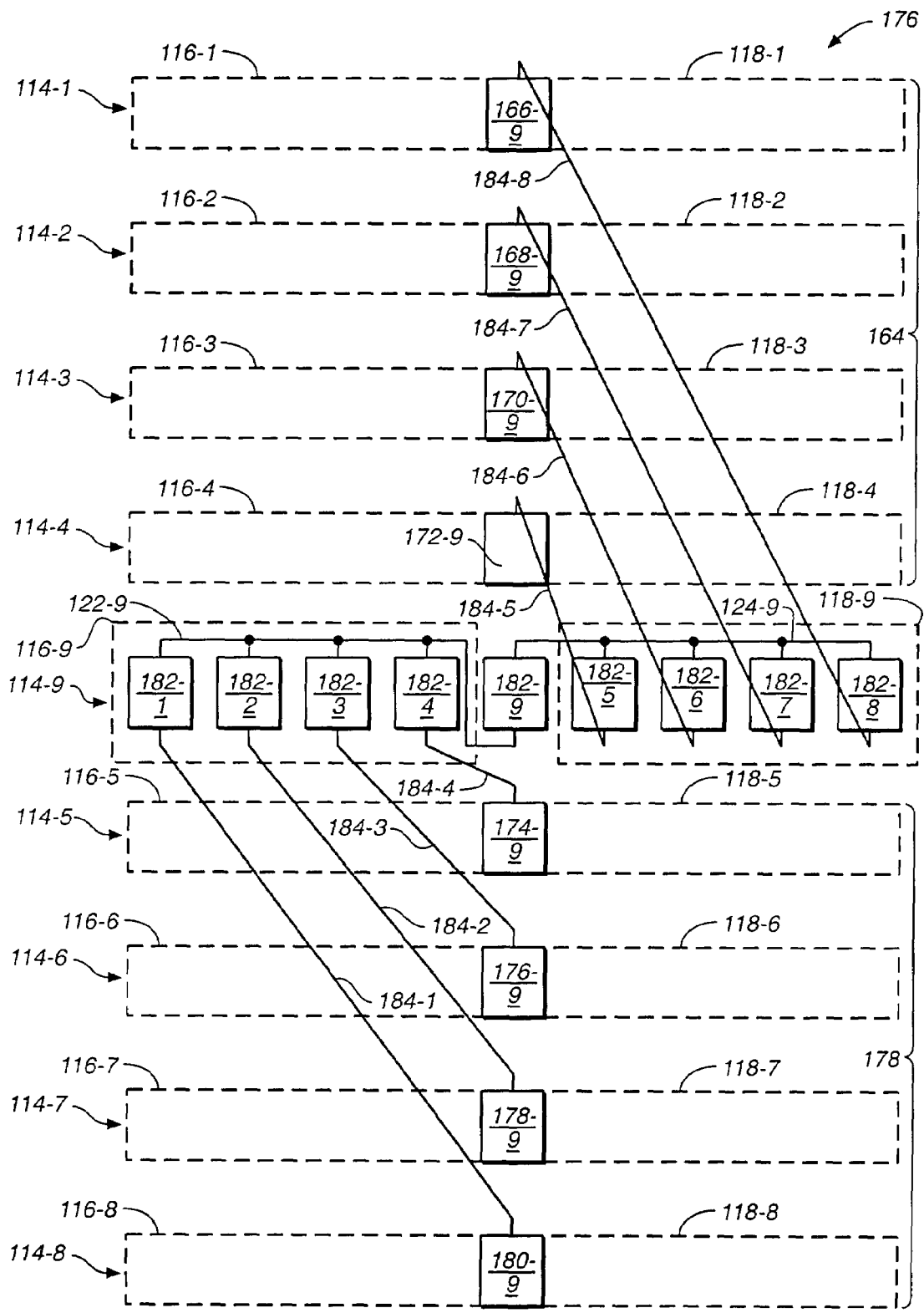
FIG. 17 is an illustrative drawing of a Level Three Subsystem which includes first and second blocks of Level Two Subsystems and a Level three Communication and Processing Subsystem in accordance with a presently preferred embodiment of the invention.

For instance, processing units 116 and 118 of FIGS. 13–14 generally correspond to blocks 164 and 178 in FIG. 17. Thus, there is a scaling of computational granularity. Communication and processing unit 120 comprises eight PEs 100-1 to 100-8. Blocks 164 and 178 comprise eight communication and processing systems 114-1 to 114-8. The computation granularity of one communication and processing unit is the "PE". The computation granularity of the two blocks 164, 178 is one communication and processing unit.

Figure 16:
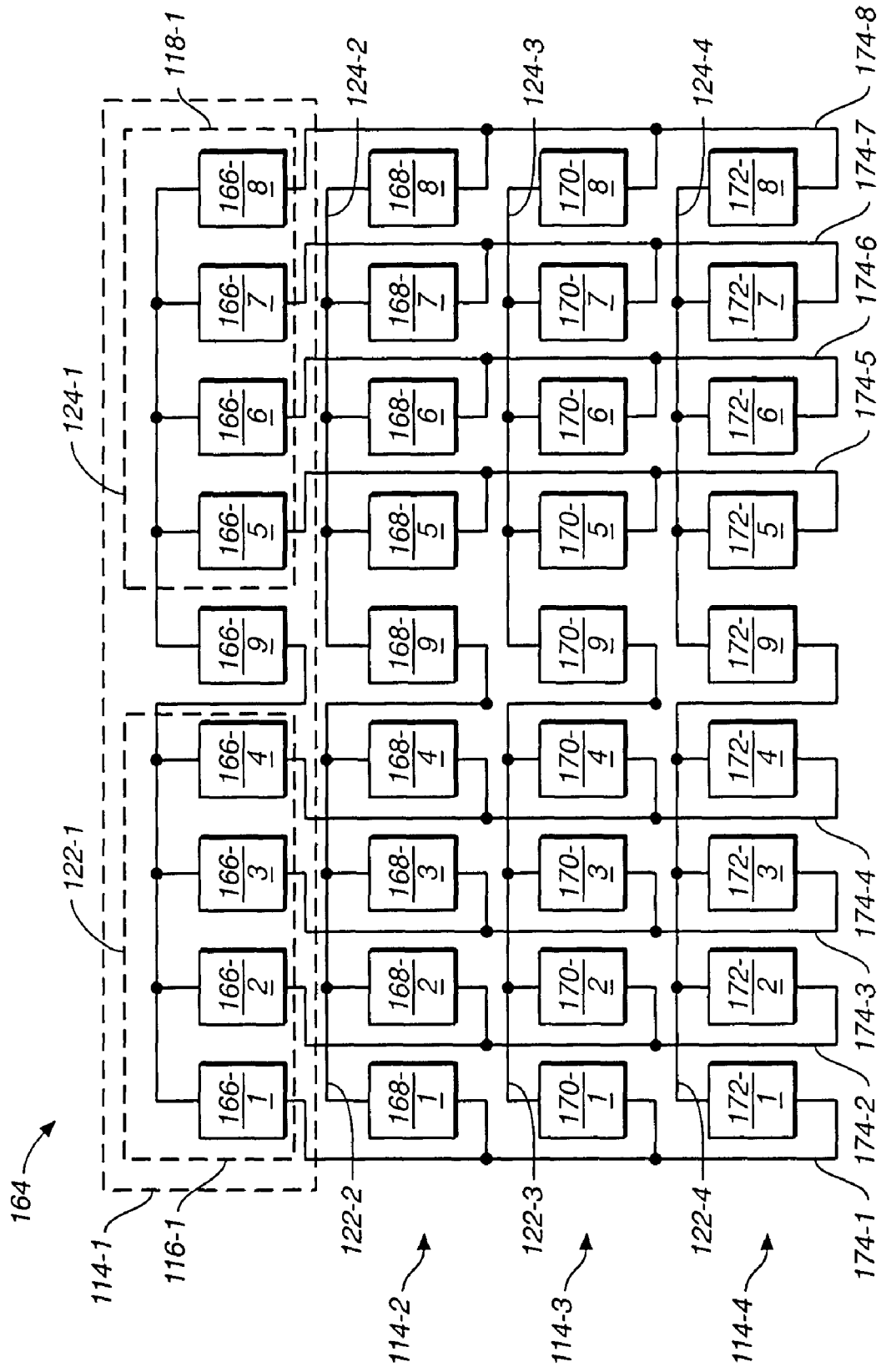
FIG. 16 is an illustrative drawing of first block of Level Two Subsystems in accordance with a presently preferred embodiment of the invention.

Referring to the illustrative drawing of FIG. 16, there is shown a first block 164 of Level Two subsystems. The first block includes multiple Level Two subsystems. In the preferred embodiment, there are four Level Two subsystems in the first block 164. A first Level Two subsystem in block 164 is shown within dashed lines 114-1. A second Level Two subsystem in block 164 is indicated by reference numerals 114-2. Similarly, third and fourth Level Two subsystems of block 164 are indicated by reference numerals 114-3 and 114-4, respectively. The first Level Two subsystem of block 164 includes processing elements 166-1 through 166-8. The first Level Two subsystem of 114-1 of block 164 also includes a Level Two communication and processing unit 166-9. Collectively, processing elements 166-1 through 166-4 are members of a first Level Two processing unit 116-1 of the first Level Two subsystem 114-1 of block 164. Likewise, processing elements 166-5 through 166-8 are members of a second Level Two processing unit 116-2 of the first Level Two subsystem 114-1 of block 164. The processing elements 166-1 through 166-4 of the first Level Two processing unit 116-1 are interconnected with each other and with the Level Two communication and processing unit 166-9 by first Level Two intra-connection lines 122-1. Similarly, processing elements 166-5 through 166-8 are interconnected with each other and with the Level Two communication and processing unit 166-9 by second Level Two intra-connection lines 122-2.

The second, third and fourth Level Two subsystems 114-2, 114-3 and 114-4 of block 164 are interconnected similarly. More specifically, the second level Two subsystem 114-2 comprises processing elements 168-1 through 168-8 and Level Two communication and processing unit 168-9. Processing elements 168-1 through 168-4 are interconnected with each other and with Level Two communication and processing unit 166-9 by first Level Two intra-connection lines 122-2. Likewise, processing elements 168-5 through 168-8 are interconnected with each other and with Level Two communication and processing unit 168-9 by second Level Two intra-connection lines 124-1. The processing elements 170-1 through 170-8 and corresponding Level Two communication and processing unit 170-9 are similarly interconnected by corresponding first and second Level Two intra-connection lines 122-3 and 124-3. Likewise, processing elements 172-1 through 172-8 and Level Two communication and processing unit 172-9 are interconnected by first and second Level Two intra-connection lines 122-4 and 124-4 as shown.

First through eighth inter-connection lines 174-1 through 174-8 inter-connect corresponding processing elements of the first, second, third and fourth Level Two subsystems 114-1 through 114-4. More specifically, inter-connection lines 174-1 interconnect processing elements 166-1, 168-1, 170-1 and 172-1. Inter-connection lines 174-2 interconnect processing elements 166-2, 168-2, 170-2 and 172-2. Inter-connection lines 174-3 interconnect processing elements 166-3, 168-3, 170-3 and 172-3. Inter-connection lines 174-4 interconnect processing elements 166-4, 168-4, 170-4 and 172-4. Inter-connection lines 174-5 interconnect processing elements 166-5, 168-5, 170-5 and 172-5. Inter-connection lines 174-6 interconnect processing elements 166-6, 168-6, 170-6 and 172-6. Inter-connection lines 174-7 interconnect processing elements 166-7, 168-7, 170-7 and 172-7. Inter-connection lines 174-8 interconnect processing elements 166-8, 168-8, 170-8 and 172-8. Each processing element of the first block 164 is connected to its corresponding inter-connection lines through the processing element's external connector. More specifically, referring to the illustrative drawing of FIG. 13, assuming that processing element 100-1 of FIG. 13 corresponds to processing element 166-1 of FIG. 16, the first Level Two processing unit external connection lines 126 (B1) interconnect with the external connector 136. The first inter-connection lines 174-1 interconnect with the external connector 136 and with corresponding external connectors of processing elements 168-1, 170-1 and 172-1 so as to provide an inter-connection path between these processing elements. The other processing elements of the first block 164 of Level Two subsystems of 114-1 through 114-4 are similarly interconnected with corresponding processing elements through their respective external connectors.

Figure 29:
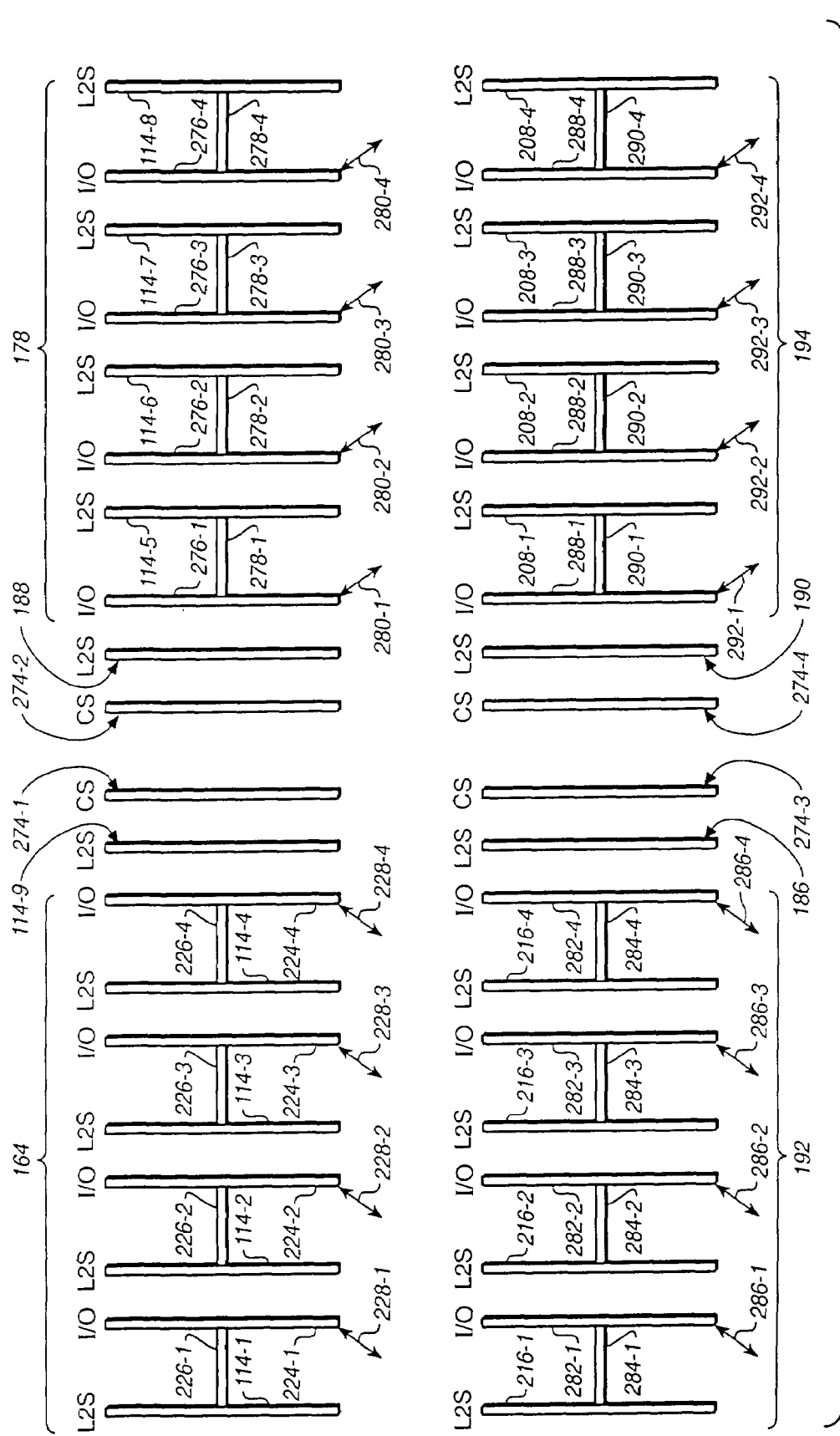
FIG. 29 shows in general terms the arrangement of various printed circuit boards employed in a presently preferred embodiment of the invention.

Referring to FIG. 16 and to FIG. 29, it will be appreciated that each of the subsystems 114-1 through 114-4 actually is disposed on a different printed circuit board (PCB). These boards are stacked adjacent to each other. This adjacent stacking of boards can result in the processing elements on the different subsystems 114-1 through 114-4 being physically located more closely together. Thus, each of the various first through eighth inter-connection lines 174-1 through 174-8 can be relatively short. It will be appreciated that this three dimensional stacking, therefore, shortens the distance between any given processing element on one of the Level Two subsystems and any other processing element on any other Level Two subsystem. This can lead to the faster processing of information.

Referring to the illustrative drawing of FIG. 17 there is shown a level three subsystem 176 which comprises the first block 164 of Level Two subsystems described in FIG. 16 plus a second block 178 of Level Two subsystems. The first block 164 includes Level Two subsystems 114-1 through 114-4. Each of the Level Two subsystems of the first block includes corresponding first Level Two processing unit 116-1 through 116-4 and corresponding second Level Two processing units 118-1 through 118-4. Each Level Two subsystem of the first block 164 also includes a corresponding Level Two communication and processing unit 166-9 through 172-9. It will be appreciated that the details of the first block of Level Two subsystems are explained in relation to FIG. 16.

The second block 178 of Level Two subsystems is similar to the first block 164. The second block 178 includes subsystems 114-5 through 114-8. Each of the Level Two subsystems of the second block 178 includes a corresponding first Level Two processing unit 116-5 through 116-8 and a corresponding second Level Two processing unit 118-5 through 118-8. Each Level Two subsystem of the second block 178 also includes a corresponding Level Two communication and processing unit 174-9 through 180-9.

The level three subsystem 176 also includes a level three communication and processing sub-system which includes a first Level Two processing unit 116-9 and a second Level Two processing unit 118-9 and a Level Two communication and processing unit 182-9. The first Level Two processing unit 116-9 comprises processing elements 182-1 through 182-4 which are interconnected to each other and to the Level Two communication and processing unit 182-9 by first Level Two intra-connection lines 122. The second Level Two processing unit 118-9 comprises processing elements 182-5 through 182-8 which are interconnected to each other and to Level Two communication and processing unit 182-9 by second Level Two intra-connection lines 124-9. The level three communication and processing system 114-9 is essentially the same as the Level Two subsystem 114 described with reference to FIG. 13.

The Level Three communication and processing subsystem 114-9 interconnects with each of the Level Two subsystems 114-1 through 114-8. More specifically, processing element 182-1 of the Level Three communication and processing system 114-9 interconnects with Level Two communication and processing unit 180-9 of the eighth Level Two subsystem 114-8 which is a member of the second block 178. Processing element 182-2 of the Level Three communication and processing subsystem 114-9 interconnects with Level Two communication and processing unit 178-9 of the seventh Level Two subsystem 114-7.

Processing element 182-3 of the Level Three communication and processing subsystem 114-9 interconnects with Level Two communication and processing unit 176-9 of the sixth Level Two subsystem 114-6. Processing element 182-4 of the Level Three communication and processing subsystem 114-9 interconnects with the Level Two communication and processing unit 174-9 of the fifth Level Two subsystem 114-5. Processing element 182-5 interconnects with Level Two communication and processing unit 172-9 of the fourth Level Two subsystem 114-4 processing element 182. Processing element 182-6 interconnects with the Level Two communication and processing unit 170-9 of the third Level Two subsystem 114-3 which is a member of the first block 164. Processing element 182-7 interconnects with Level Two communication and processing unit 168-9 of the second Level Two subsystem 114-2. Processing element 182-8 of the Level Three communication and processing sub-system interconnects with Level Two communication and processing unit 166-9 of the first Level Two subsystem 114-1 which is a member of the first block 164 of Level Two subsystems.

Referring to FIGS. 13 and 17, assuming that processing element 182-1 of the Level Three communication and processing sub-system 114-9 corresponds to processing element 100-1 of FIG. 13, then the interconnection 184-1 between processing element 182-1 and Level Two communication and processing 180-9 interconnects with processing element 182-1 through an external connector like external connector 136 of FIG. 13 which is interconnected with processing element 100-1 via a first Level Two processing unit external connection lines 126. Thus, it will be appreciated that the external connection lines of processing element 182-1 are used for interconnection with interconnection lines 184-1.

Referring to FIGS. 14 and 17 and assuming that Level Two communication and processing unit 180-9 corresponds to the Level Two communication and processing unit 120 of FIG. 14, the interconnection lines 184-1 interconnect with an external connector of unit 180-9 like the external connector 154 of FIG. 14. Moreover, the interconnection lines 184-1 are interconnected to the unit 180-9 through such an external connector via first external lines like the first external lines 150 (EXA) shown in FIG. 14.

Figure 1:
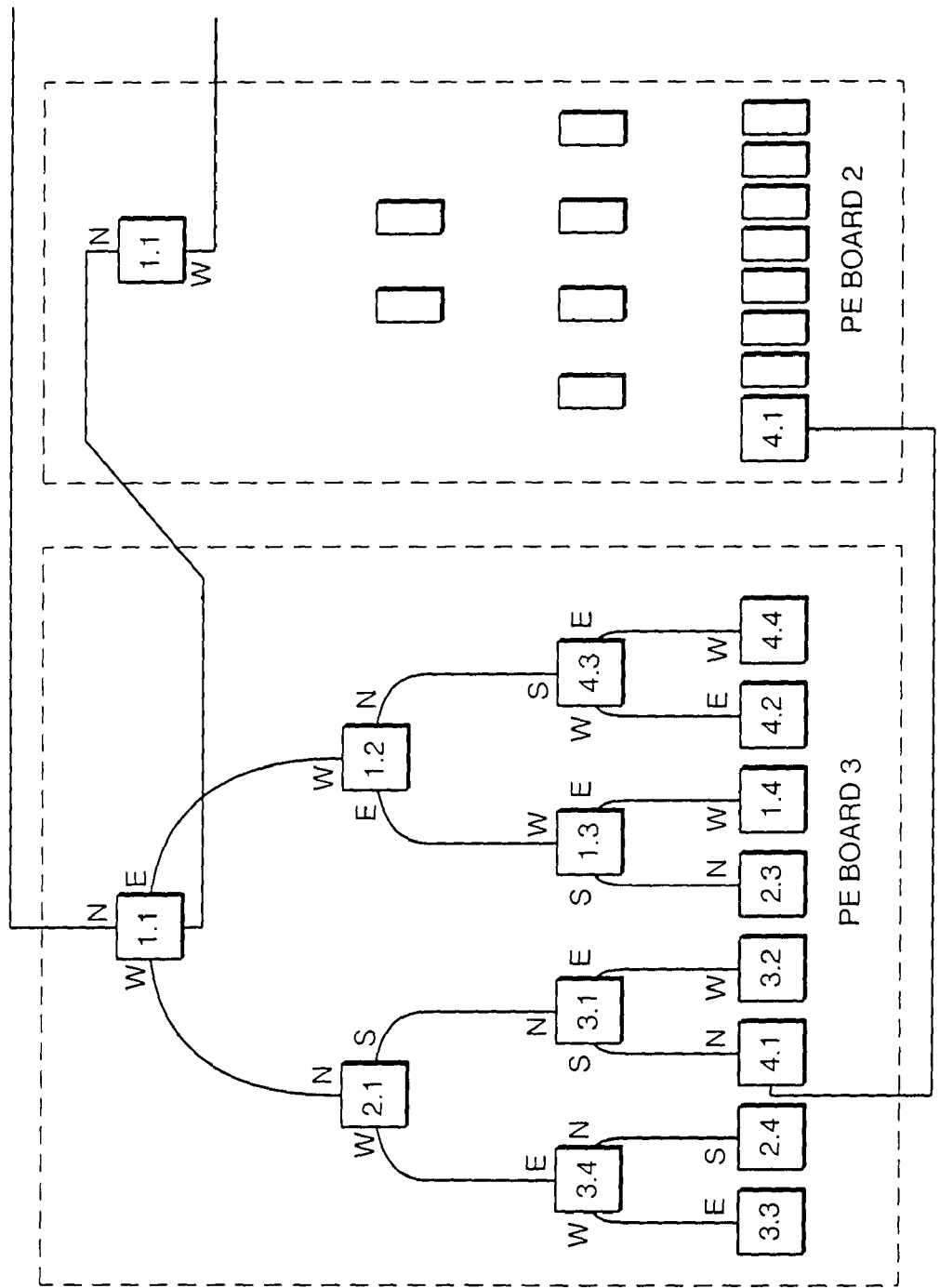
FIG. 1 is an illustrative drawing of three prior art PE boards with their port-to-port connections for a tree lattice structure.
Figure 3:
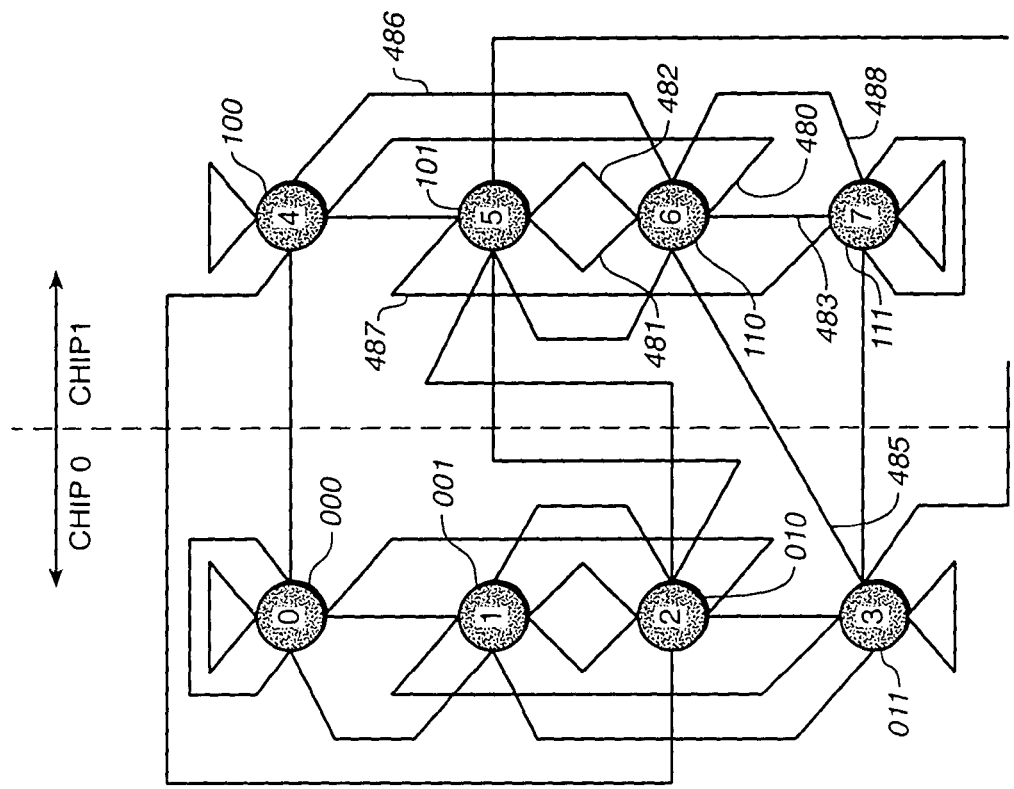
FIG. 3 is an illustrative drawing of a prior art two level HdB computer including 8 processors interconnected by an HdB network.
Figure 2:
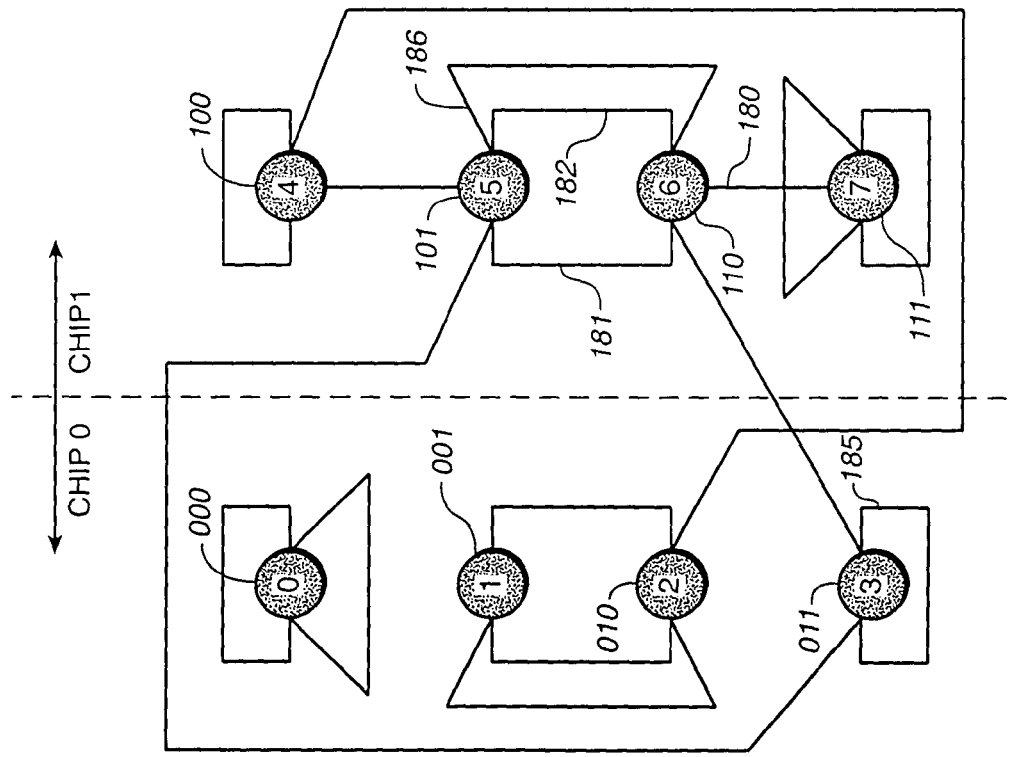
FIG. 2 is an illustrative drawing of a prior art two level HSE computer including 8 processors interconnected by an HSE network.
Figures 4, 4A:
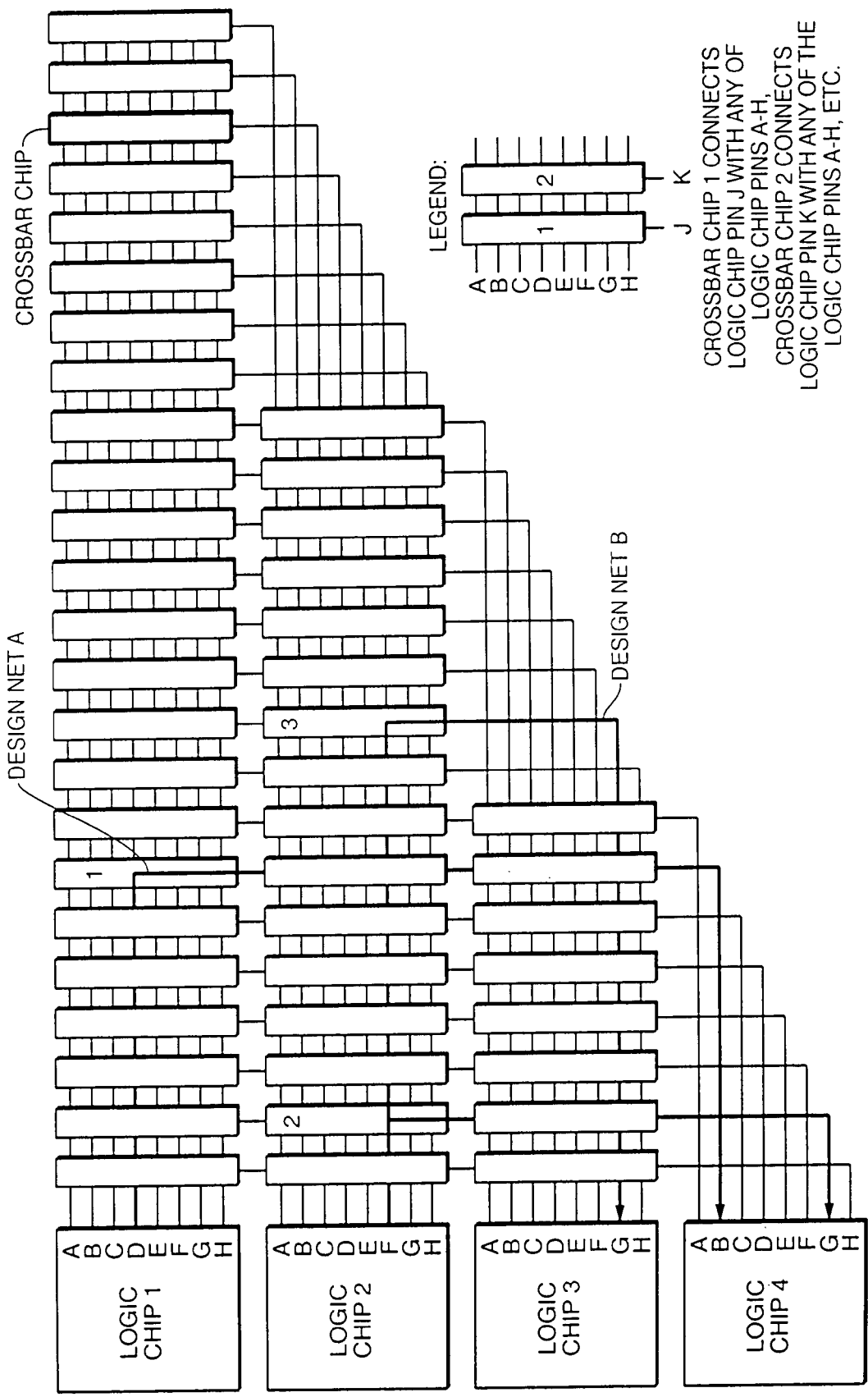
FIGS. 4–4A are illustrative schematic block diagrams of a prior art cross-bar interconnect system.
Figure 5:
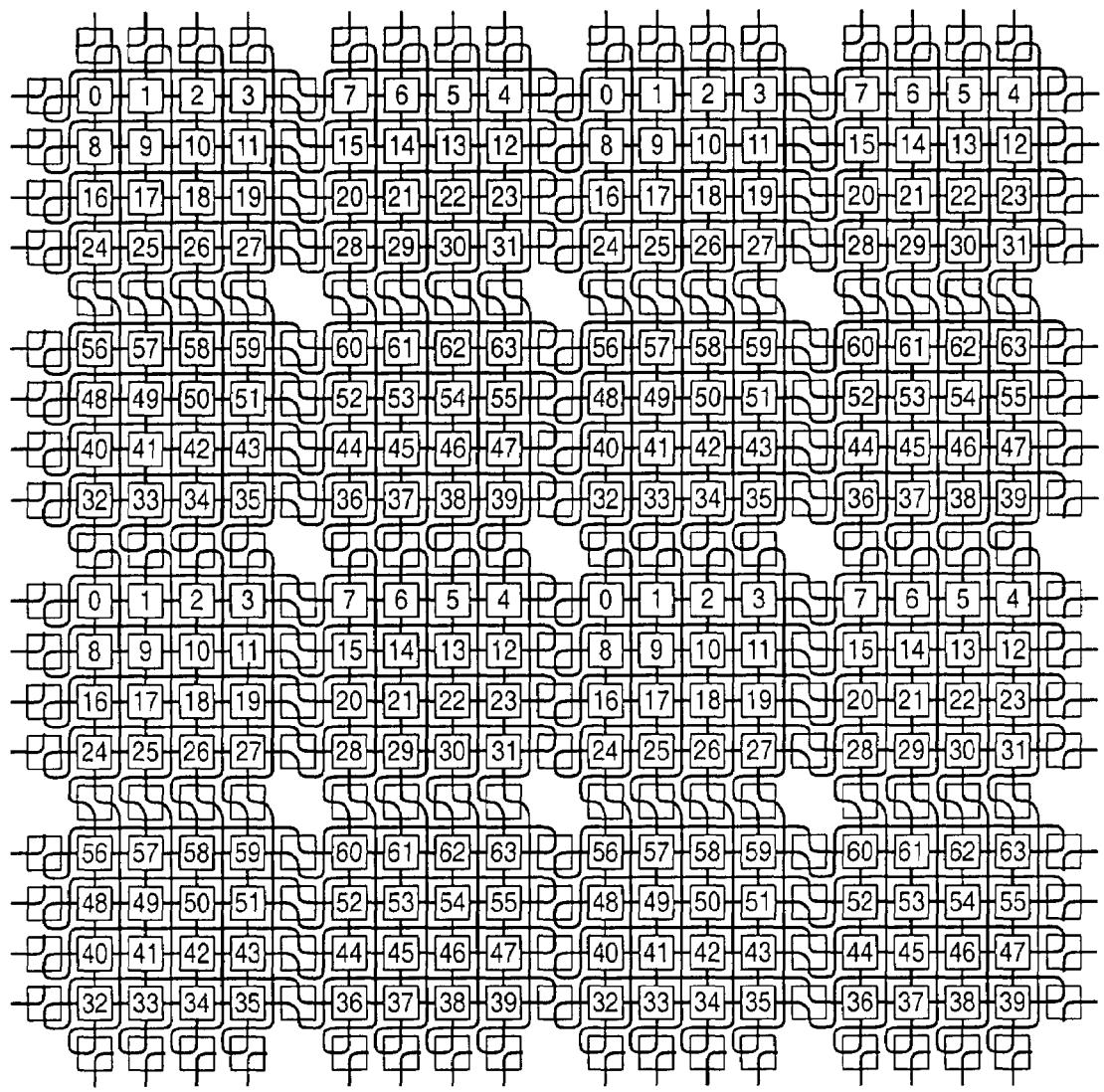
FIG. 5 is an illustrative drawing of prior art reconfigurable two-dimensional torus networks.
Figure 6:
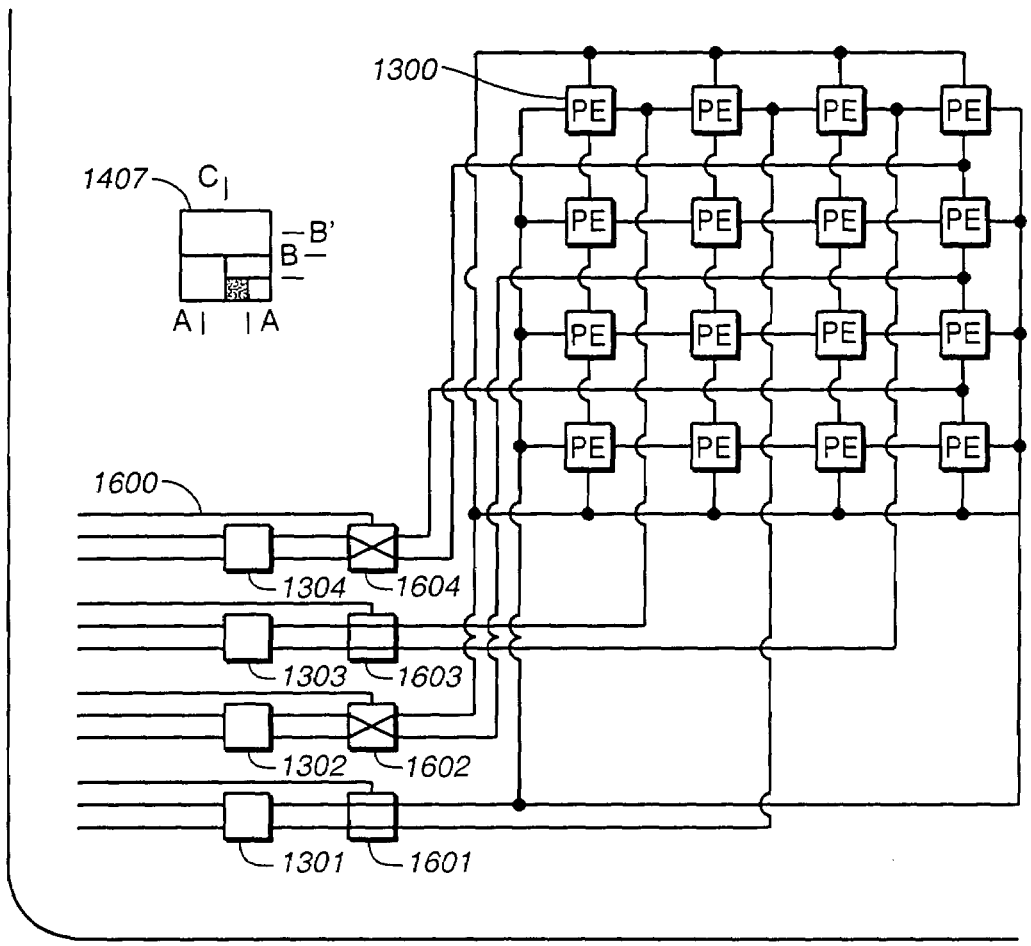
FIG. 6 is an illustrative drawing of a prior art sixteen valued, mixed-radix 3-dimensional object name space.
Figure 7:
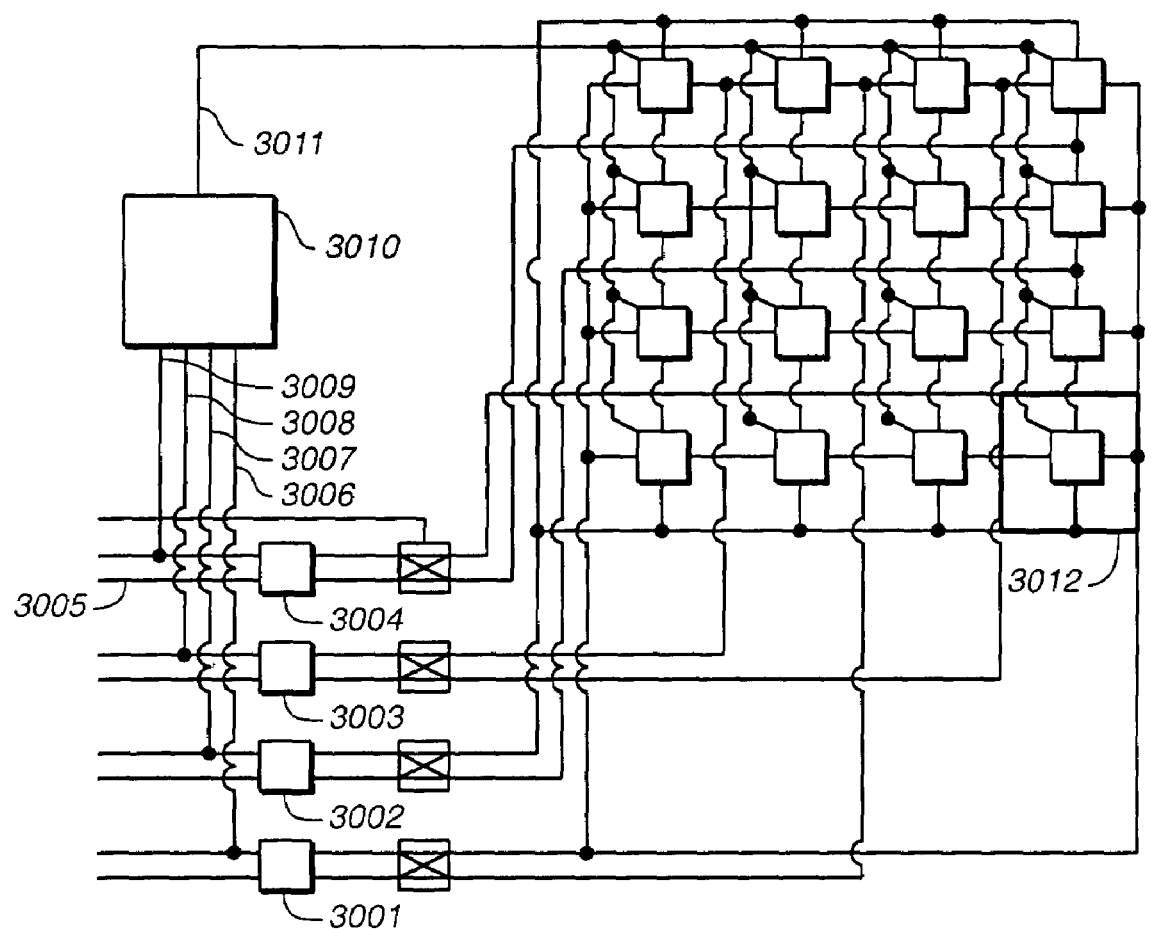
FIG. 7 is an illustrative drawing of a prior art polymorphic interconnection network module for concurrent multiple element connection.
Figure 8:
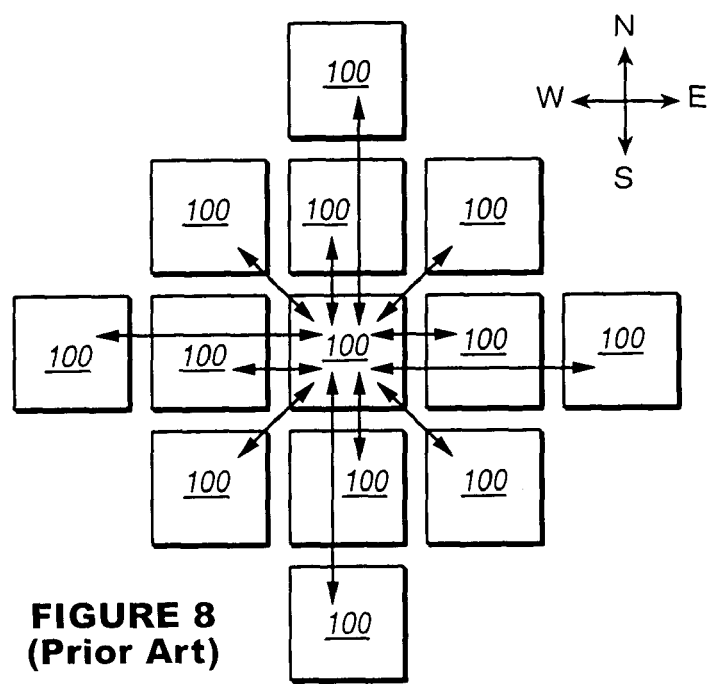
FIG. 8 is an illustrative prior art level-1 network structure in which the output of every basic functional unit is passed to it nearest neighbors in all directions.
Figure 9:
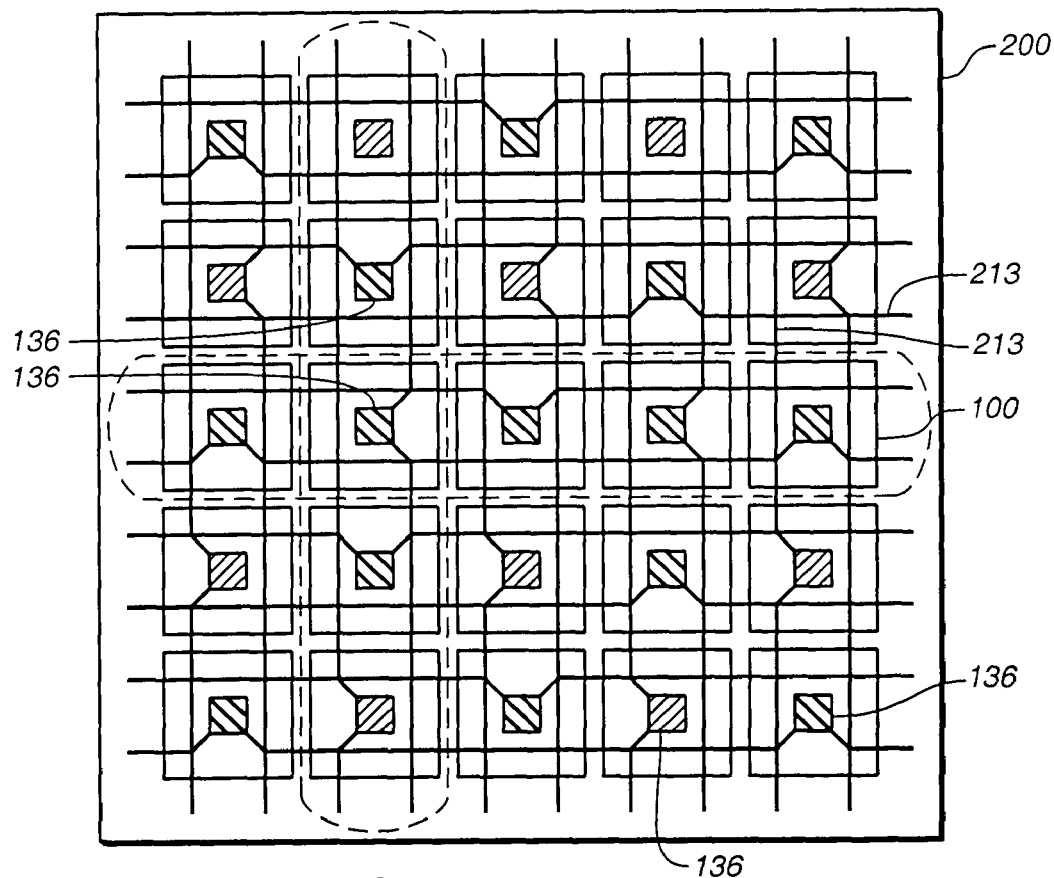
FIG. 9 is an illustrative drawing of a prior art level-2 network structure in which length-4 broadcast lines are provided between rows and columns of cells containing a 5×5 array of basic functional units.
Figure 10:
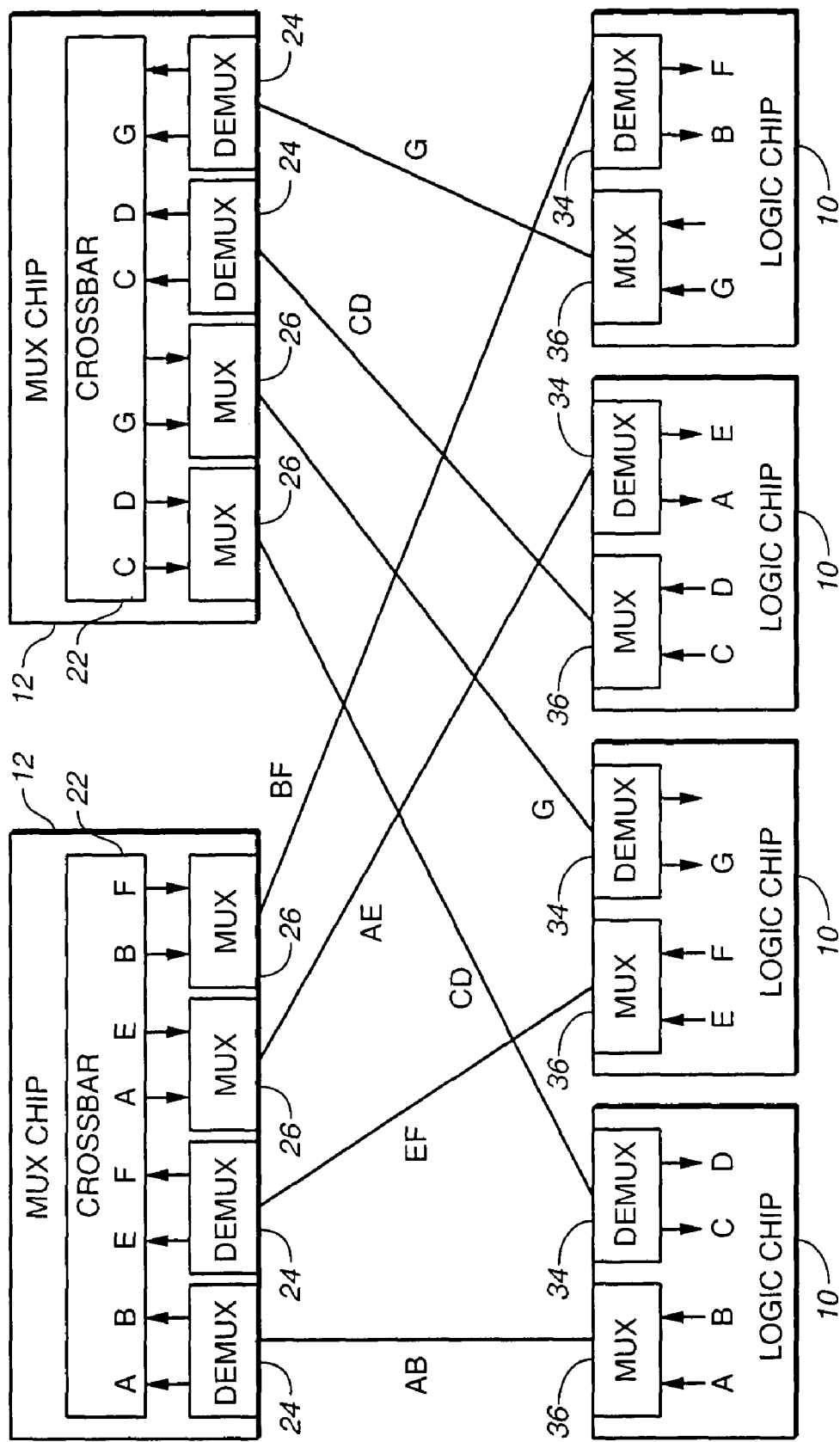
FIG. 10 is an illustrative block diagram of a prior art partial crossbar network incorporating time-multiplexing.
Figure 11:
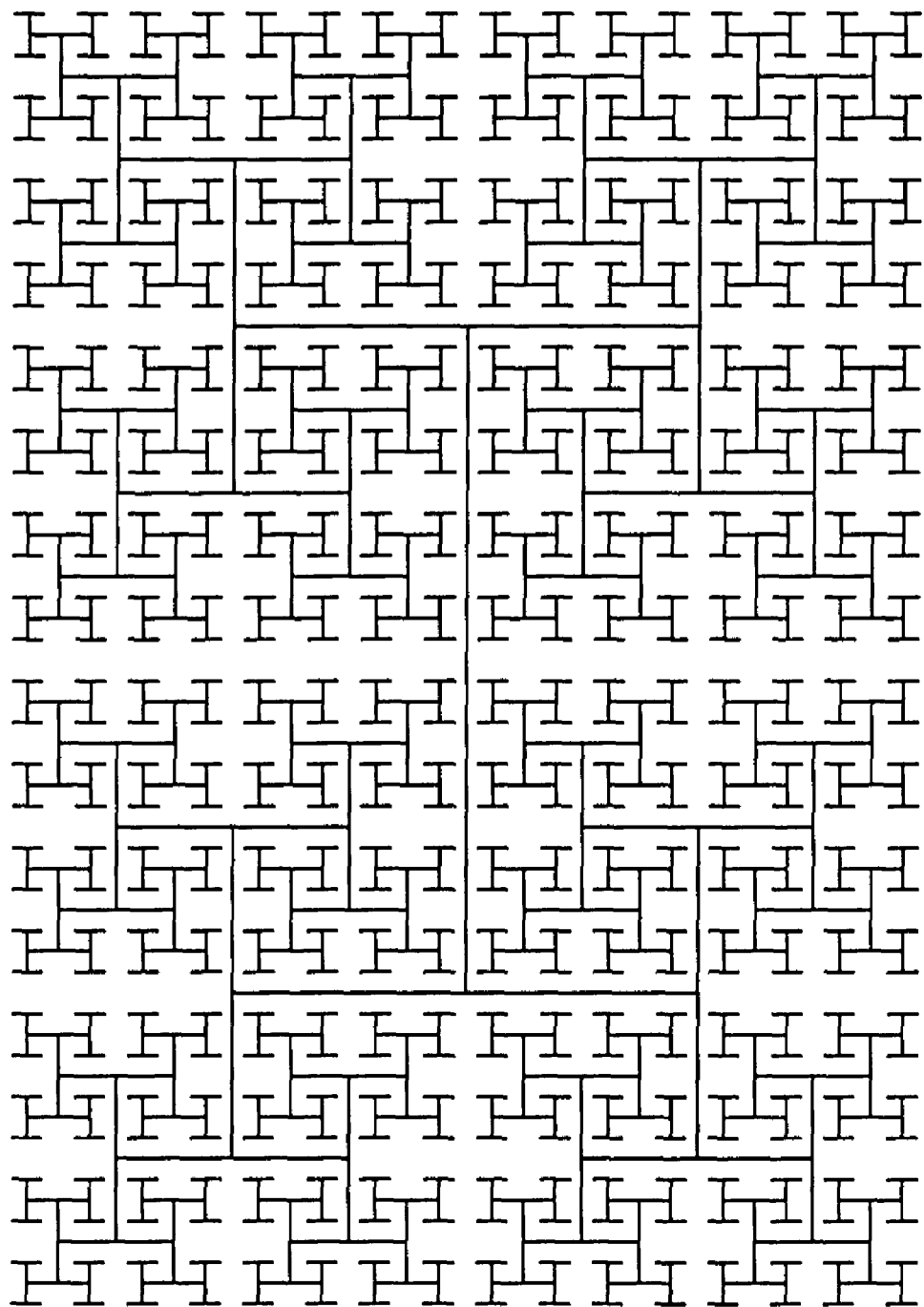
FIG. 11 is an illustrative drawing of an H-fractal.

Each of the multiple interconnection lines 184-1 through 184-8 is similarly interconnected with corresponding processing elements 182-1 through 182-8 of the Level Three communication and processing sub-system 114-9 and corresponding Level Two communication and processing units 166-9 through 180-9 of Level Two sub-systems 114-1 through 114-8. That is, each processing element of Level Three communication and processing sub-system 114-9 interconnects with its corresponding interconnection lines 184-1 through 184-8 via a Level Two processing unit external connection. For instance, processing unit 182-1 interconnects with lines 184-1 via first first Level Two processing unit external connection lines like lines 126 (B1) of FIG. 13. Processing element 182-2 may interconnect with interconnection lines 184-2 via second first Level Two unit external connection lines like lines 128 in FIG. 13. Processing element 182-3 may interconnect with interconnection lines 184-3 via third first Level Two unit external connection lines like lines 130 in FIG. 13. Processing element 182-4 may interconnect with interconnection lines 184-4 via fourth first Level Two unit external connection lines like lines 132 in FIG. 13. Processing element 182-5 may interconnect with interconnection lines 184-5 via fourth second Level Two processing unit external connection lines like lines 146 in FIG. 2. Processing element 182-6 may interconnect with interconnection lines 184-6 via third second Level Two processing unit external connection lines like lines 144 in FIG. 13. Processing element 182-7 may interconnect with interconnection lines 184-7 via a second second Level Two processing unit external connection lines like lines 142 in FIG. 13. Processing element 182-8 may interconnect with interconnection lines 184-8 via first second Level Two processing unit external connection lines like lines 140 in FIG. 13.

Furthermore, each of the Level Two communication and processing units 166-9 through 180-9 interconnect with their corresponding interconnection lines 184-1 through 184-8 in a similar manner. Specifically, each of the Level Two communication and processing units 166-9 through 180-9 interconnects with its corresponding interconnection line 184-1 through 184-8 via first external lines like external lines 150 in FIG. 14.

It will be appreciated that the Level Three communication and processing system, which comprises a Level Two communication and processing unit serves both as a communication node between the first and second blocks 164, 178 and can serve to process information produced by each of those blocks. For instance, the first block 164 might be programmed to compute a fast fourier transform (FFT), and the second block 178 might also be programmed to compute an FFT. The Level Three communication and processing sub-system 114-9 might be configured to perform a pattern matching function upon the results of the FFT computation by the first block 164 and the results of the FFT computation performed by the second block 178.

Figure 18:
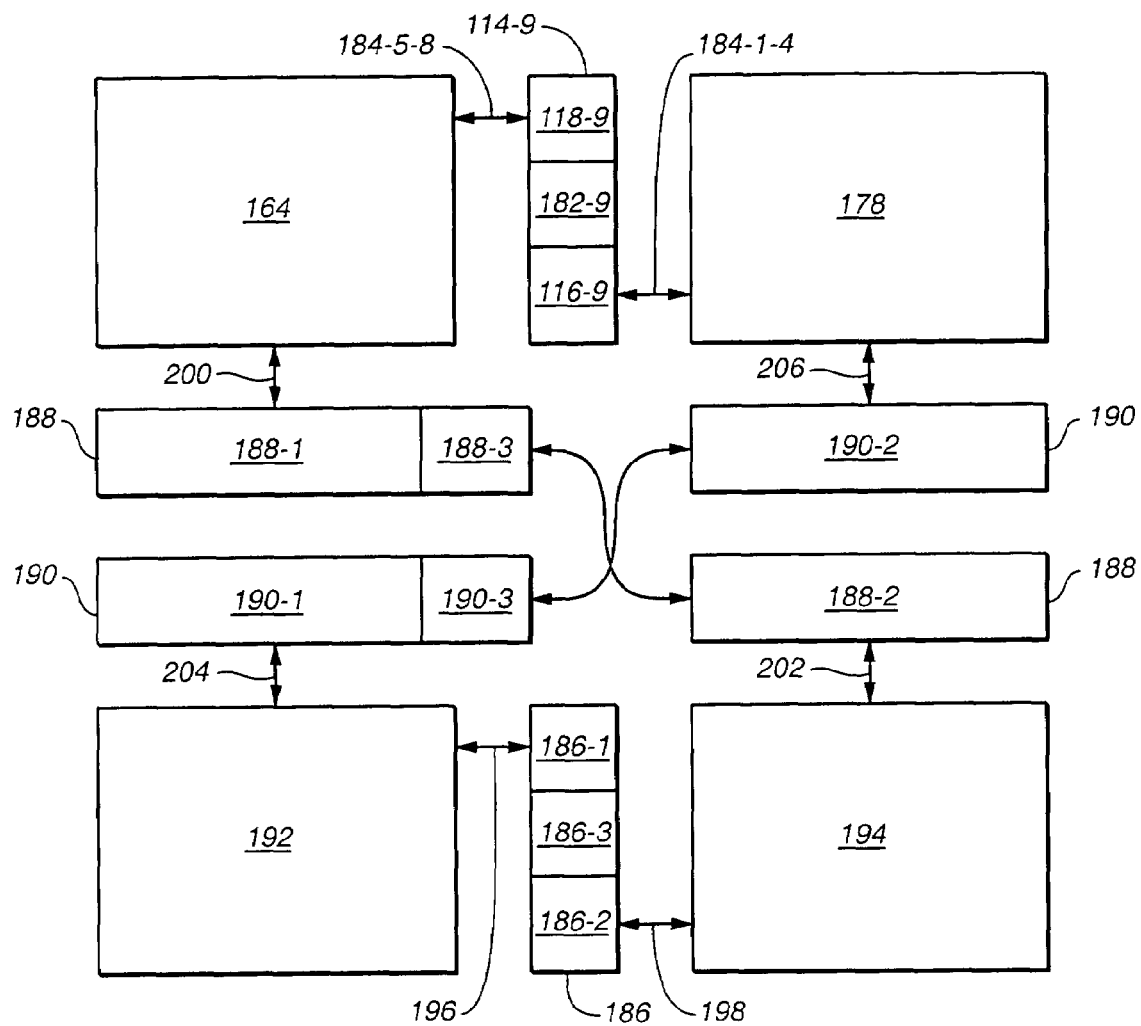
FIG. 18 is an illustrative drawing of the relationships among multiple Level Three communication and processing sub-systems and multiple blocks of Level Two sub-systems in accordance with a presently preferred embodiment of the invention.

Referring to the illustrative drawings of FIG. 18, there is shown a block diagram illustrating the relationships among multiple Level Three communication and processing sub-systems and multiple blocks of Level Two sub-systems. A first Level Three communication and processing sub-system 114-9 interconnects first and second blocks 164, 178 of Level Two sub-systems as described in detail in FIG. 17. Two-headed arrow 184-1-4 represents the interconnections between the processing elements of sub-system 114-9 and the respective Level Two communication and processing units of the Level Two sub-system of block 178. The arrow labeled 184-5-8 represents the interconnections shown in detail in FIG. 17 between certain processing elements of Level Three communication and processing sub-system 114-9 and respective Level Two communication and processing units of the multiple Level Two sub-systems of block 164. A third block of Level Two sub-systems 192 and a fourth block of Level Two subsystems 194 each is substantially the same as the first and second blocks 164, 178 of Level Two sub-systems. A second Level Three communication and processing sub-system 186 is substantially the same as sub-system 114-9. Of course, it will be appreciated that sub-system 114-9 is essentially the same as the Level Two sub-system 114 described with reference to FIG. 13. The second Level Three communication and processing sub-system 186, like sub-system 114-9, includes a first Level Two processing unit 186-1 and a second Level Two processing unit 186-2 and a Level Two communication and processing unit 186-3. The second Level Three communication and processing sub-system 186 includes first interconnections indicated by two-headed arrow 196 between unit 186-1 and block 192 and includes second interconnections indicated by two-headed arrow 198 between unit 186-2 and block 194. It will be appreciated that the interconnections 196 are substantially the same as interconnections 184-5 through 184-8 shown in FIG. 17, and that the interconnections 198 are substantially the same as the interconnections 184-1 through 184-4 shown in FIG. 17. Thus, the details of the third and fourth blocks 192, 194 and the second Level Three communication and processing sub-system 186 and their interconnections will be appreciated from FIG. 17 and need not be described in detail herein.

A third Level Three communication and processing sub-system 188 interconnects blocks 164 and 194. A fourth Level Three communication and processing sub-system 190 interconnects blocks 178 and 192. The third and fourth Level Three communication and processing sub-systems 188, 190 each is substantially the same as the Level Two sub-system described with reference to FIGS. 13 and 14. The third Level Three communication and processing sub-system 188 includes a first Level Two processing unit 188-1, a second Level Two processing unit 188-2, and a Level Two communication and processing unit 188-3. Similarly, the fourth Level Three communication and processing sub-system 190 includes a first Level Two processing unit 190-1, a second Level Two processing unit 190-2 and a third Level Two communication and processing unit 190-3. The first Level Two processing unit 188-1 interconnects with block 164 as indicated by two-headed arrow 200. The second Level Two processing unit 188-2 interconnects with block 194 as indicated by two-headed arrow 202. The first Level Two processing unit 190-1 interconnects with block 192 as indicated by two-headed arrow 204. The second Level Two processing unit 190-2 interconnects with block 178 as indicated by two-headed arrow 206. It will be appreciated that each of sub-systems 188 and 190 comprises a respective unitary sub-system, although each is shown in two parts interconnected by respective arrows. The reason for illustrating sub-systems 188 and 190 in this fashion is to aid in the understanding of the communications paths provided by the third and fourth Level Three communication and processing sub-systems 188, 190. The arrow between unit 188-3 and unit 188-2 is intended to indicate that sub-system 188 is in fact a unitary sub-system. The arrow between unit 190-3 and 190-2 is intended to indicate that sub-system 190 also is a unitary sub-system.

Figure 19:
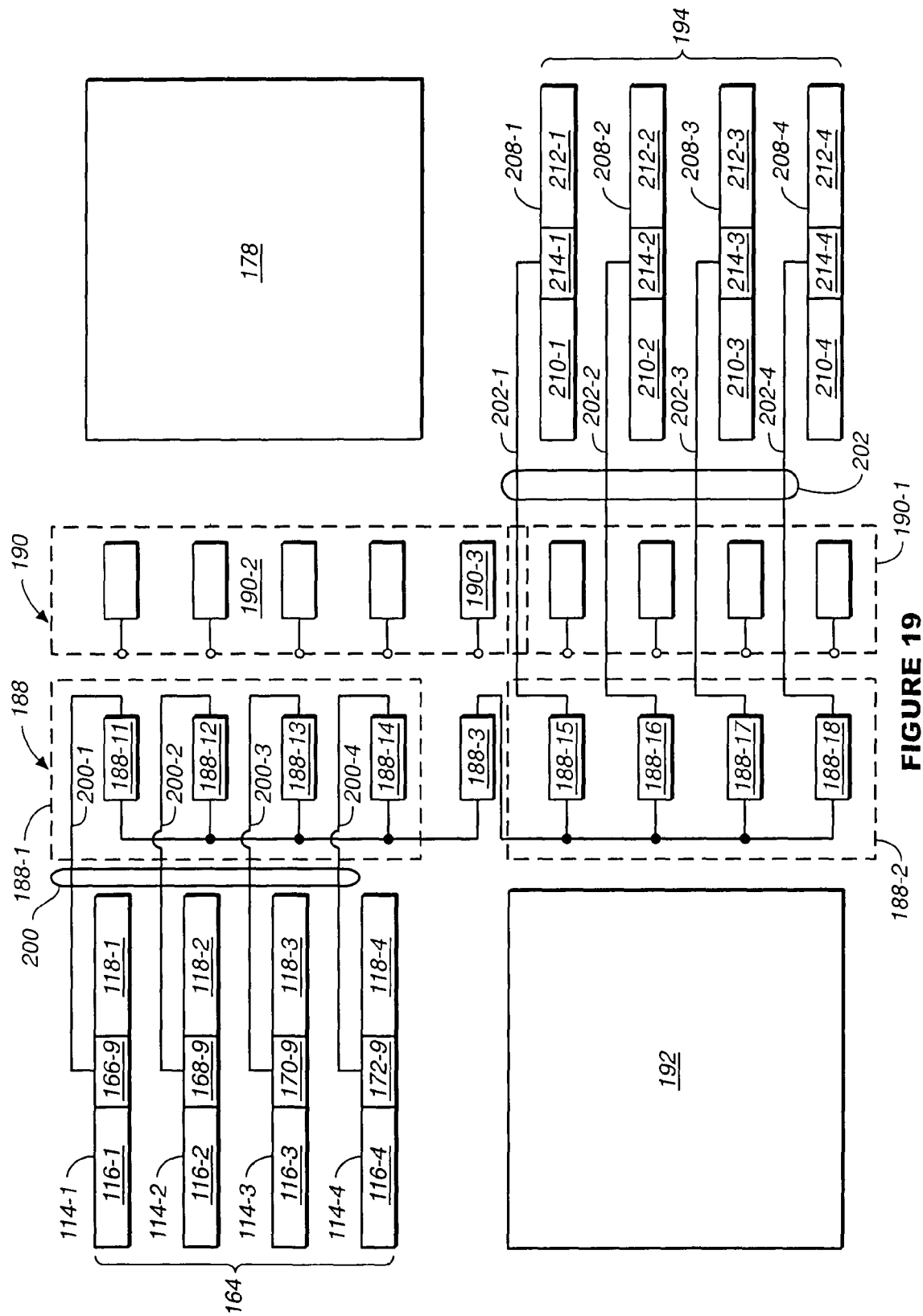
FIG. 19 is an illustrative drawing of respective first, second, third and fourth blocks of Level Two Subsystems, in which certain details of the first and fourth blocks are shown, in accordance with a presently preferred embodiment of the invention.
Figure 20:
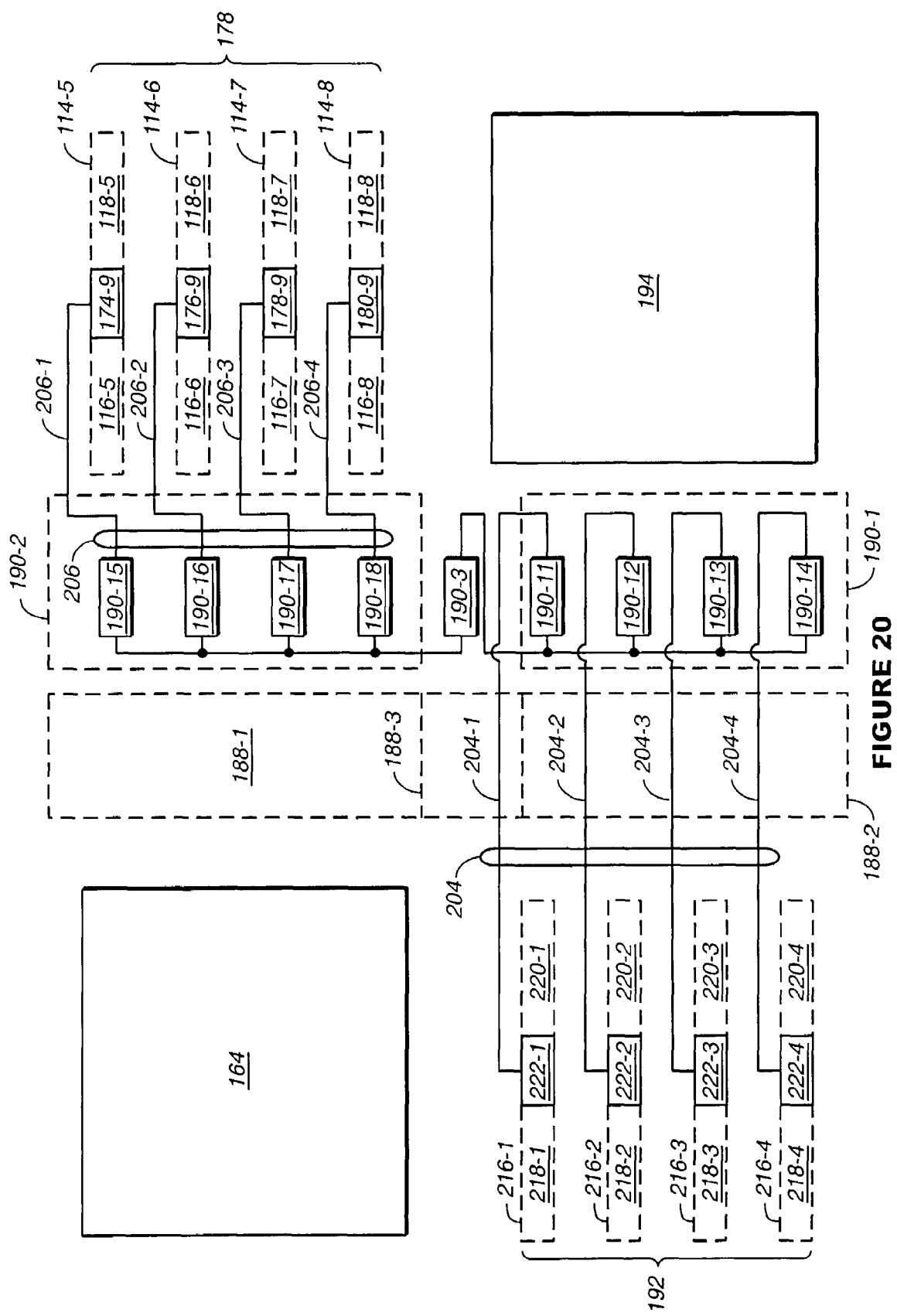
FIG. 20 is an illustrative drawing of respective first, second, third and fourth blocks of Level Two Subsystems, in which certain details of the second and third blocks are shown, in accordance with a presently preferred embodiment of the invention.

The illustrative drawings of FIG. 19 and FIG. 20 show additional details of the interconnections shown in general in FIG. 18. FIG. 19 provides additional details of the respective interconnections 200 and 202 between the first Level Two processing unit 188-1 and the first block 164 and between the second Level Two processing unit 188-2 and the fourth block 194. The illustrative drawings of FIG. 19 show additional details of the respective interconnections 204 and 206 between the first Level Two processing unit 190-1 and the third block 192 and between the second Level Two processing unit 192 and the second block 178.

Referring to the illustrative drawings of FIG. 19, there are shown the respective first, second, third and fourth blocks 164, 178, 192 and 194. Selective details of the first and fourth blocks 164, 194 are shown. No details of the second and third blocks 178 and 192 are shown in order to simplify the explanations of interconnections between the first and fourth blocks 164 and 194. Moreover, the third and fourth Level Three communication and processing sub-system 188, 190 are shown. Certain of the details of the third Level Three communication and processing sub-system 188 are shown, but none of the details of the fourth Level Three communication and processing sub-system 190 are shown so as to simplify the explanation of the interconnections between the first and fourth blocks 164, 194. Furthermore, neither the first nor the second Level Three communication and processing sub-systems 114-9, 186 are shown in FIG. 19 so as to further simplify the drawing.

The first block includes first, second, third and fourth Level Two sub-systems 114-1 through 114-4 which have been described with reference to FIGS. 16 and 17. More specifically, the respective first through fourth Level Two sub-systems 114-1 through 114-4 include respective first Level Two processing units 116-1 through 116-4, and include respective second Level Two processing units 118-1 through 118-4 and include respective Level Two communication and processing units 166-9 through 172-9.

Similarly, the fourth block 194 of Level Two sub-systems includes Level Two sub-systems 208-1 through 208-4. The respective sub-systems 208-1 through 208-4 include respective first Level Two processing units 210-1 through 210-4 and include respective second Level Two processing units 212-1 through 212-4 and include respective Level Two communication and processing units 214-1 through 214-4. The first Level Two processing unit 188-1 includes processing elements 188-11 through 188-14. Second Level Two processing unit 188-2 includes processing elements 188-15 through 188-18. Level Two communication and processing unit 188-3 is shown interconnected with the respective processing elements 188-11 through 188-14 and with the respective processing elements 188-15 through 188-18.

The interconnections 200 interconnect respective processing elements of the first Level Two processing unit 188-1 and respective Level Two communication and processing units of the Level Two sub-systems 114-1 through 114-4 of the first block 164. Similarly, the interconnections 202 interconnect respective processing elements of the second Level Two processing unit 188-2 and respective Level Two communication and processing units of respective Level Two sub-systems 208-1 through 208-4 of the fourth block.

More specifically, processing element 188-11 is interconnected with a respective first Level Two processing unit external connection. For example, assuming that processing element 188-1 corresponds to processing element 100-1 shown in FIG. 13, then the first Level Two processing unit and external connection of processing unit 188-1 is like the external connection labeled 126 in FIG. 13. This external connection of processing unit 188-11 interconnects with interconnect lines 200-1. The Level Two communication and processing unit 166-9 includes second external connection lines. Assuming for example, that Level Two communication and processing unit 166-9 is like the Level Two communication and processing unit 120 described with reference to FIG. 14, then the second external connection lines 152 shown in FIG. 14 correspond to the second external connection lines of unit 166-9. These second external connection lines interconnect with interconnection lines 200-1. Thus, processing element 188-1 is interconnected with Level Two communication and processing unit 166-9 via interconnection lines 200-1. Moreover, processing element 188-11 interconnects with interconnection lines 200-1 via first Level Two processing unit external connections like those labeled 126 in FIG. 13, and Level Two communication and processing unit 166-9 interconnects with interconnection lines 200-1 via second external connection lines like the external connection lines labeled 152 in FIG. 14. In a similar fashion, each of respective processing elements 188-12 through 188-14 interconnects via interconnection lines 200-2 through 200-4 with respective Level Two communication and processing units 168-9 through 172-9.

In a like manner, the respective elements 188-15 through 188-18 interconnect via interconnection lines 202-1 through 202-4 with Level Two communication and processing units 214-1 through 214-4. For example, assuming that processing element 188-5 corresponds to processing element 100-5 in FIG. 13, then processing element 188-15 is interconnected with second Level Two processing unit external connection lines like external connection lines labeled 140 in FIG. 13. These external connection lines are interconnected with interconnection lines 202-1. Further, assuming that Level Two communication and processing unit 214-1 is like the Level Two communication and processing unit 120 of FIG. 14, then it includes second external connection lines like lines labeled 152 in FIG. 14. These second external connection lines are interconnected with interconnection lines 202-1. In this manner, processing element 188-15 is interconnected with Level Two communication and processing unit 214-1 via interconnection lines 202-1. The respective processing elements 188-16 through 188-18 are interconnected with respective Level Two communication and processing units 214-1 through 214-4 via interconnection lines 202-2 through 202-4.

Referring to the illustrative drawings of FIG. 20, there is shown the first, second, third and fourth blocks 164, 178, 192 and 194 of Level Two sub-systems. Certain details of the second and third blocks 178 and 192 are shown, but no details of the first and fourth blocks 164 and 194 are shown. In addition, the third level and fourth Level Three communication and processing sub-systems 188, 190 are shown. However, in order to simplify the drawings and not confuse the explanation, the first and second Level Three communication and processing sub-systems 114-9 and 186 have been omitted from FIG. 20. Certain details of the fourth Level Three communication and processing sub-system 190 are shown, but no details of the third Level Three communication and processing sub-system 188 are shown. The second block 178 includes Level Two sub-systems 114-5 through 114-8. The nature of these sub-systems will be appreciated from the discussion above, particularly this discussion with reference to FIGS. 17 and 19. Thus, no further discussion here is necessary. Similarly, the third block 192 includes Level Two sub-systems 216-1 through 216-4. Each of the respective sub-systems 216-1 through 216-4 includes a respective first Level Two processing unit 218-1 through 218-4 and includes second Level Two processing units 220-1 through 220-4 and includes respective Level Two communication and processing units 222-1 through 222-4.

The second Level Two processing unit 190-2 of the fourth Level Three communication and processing sub-system 190 includes processing elements 190-15 through 190-18. Respective interconnection lines 206-5 through 206-8 interconnect respective processing elements 190-15 through 190-18 with respective Level Two communication and processing units 174-9 through 180-9. Assuming that processing element 190-15 generally corresponds to processing element 100-5 in FIG. 13, then processing element 190-15 is interconnected with second Level Two processing unit external connection lines like lines 140 shown in FIG. 13. These second Level Two processing unit external connection lines of processing element 190-15 interconnect with interconnection lines 206-5. Assuming that Level Two communication and processing unit 166-9 is generally like unit 120 shown in FIG. 14, then unit 174-9 includes second external connection lines like lines 152 shown in FIG. 14. These second external connection lines of unit 174-9 interconnect with interconnection lines 206-5. In a similar manner, respective processing elements 190-16 through 190-18 interconnect with Level Two communication and processing units 176-9 through 180-9 via respective interconnection lines 206-6 through 206-8.

The first Level Two processing unit 190-1 of the fourth Level Three communication and processing sub-system 190 includes processing elements 190-11 through 190-14. Respective interconnection lines 204-1 through 204-4 interconnect the respective processing elements 190-11 through 190-14 with respective Level Two communication and processing units 222-1 through 222-4. For example, assuming that processing element 190-11 is like processing element 100-1 of FIG. 20, then processing element 190-11 interconnects with first Level Two processing unit external connection lines like lines 126 in FIG. 13. The first Level Two processing unit external connection lines of processing element 190-11 interconnect with interconnection lines 204-1. Assuming that Level Two communication and processing unit 222-1 is like unit 120 in FIG. 14, then unit 222-1 includes second external connection lines like lines 152 in FIG. 14. The second external connection lines of unit 222-1 interconnect with interconnection lines 204. In this manner, processing element 190-11 and Level Two communication and processing unit 222-1 interconnect with one another. In a similar manner, respective processing elements 190-12 through 190-14 interconnect with respective Level Two communication and processing units 222-2 through 222-4 via interconnection lines 204-2 through 204-4.

Figure 33:
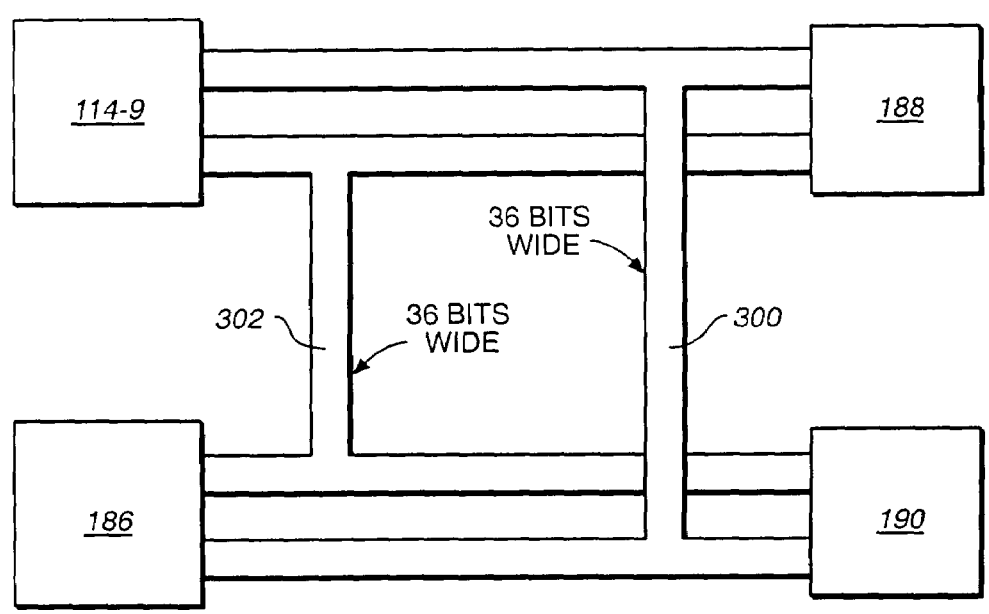
FIG. 33 is an illustrative drawing of interconnection wide pads among the third level communications and processing units that interconnect the respective blocks; there are two such wide pads; these wide pads are particularly well suited to broadcast information throughout the system.

Referring to the illustrative drawings of FIG. 33, there is shown an illustration of the interconnection among the first through fourth Level Three communication and processing sub-systems 114-9, 186, 188 and 190. Referring to the illustrative drawings of FIG. 14, and assuming that each of the sub-systems is essentially the same as the communication and processing unit 120 of FIG. 14, then the first external lines of the first and third sub-systems 114-9 and 188, corresponding to lines labeled 150 in FIG. 14, and the second external lines of the second and fourth sub-systems 186, 190, corresponding to lines 152 in FIG. 14, are interconnected. Likewise, the second external lines of the first and third sub-systems 114-9, 188, corresponding to lines 152 in FIG. 14, are interconnected with each other and with the first external lines of the second and fourth sub-systems 186, 189, corresponding to lines 150 in FIG. 14. The respective first and second external lines of the processing unit of FIG. 14 each include 36 lines.

Figure 31:
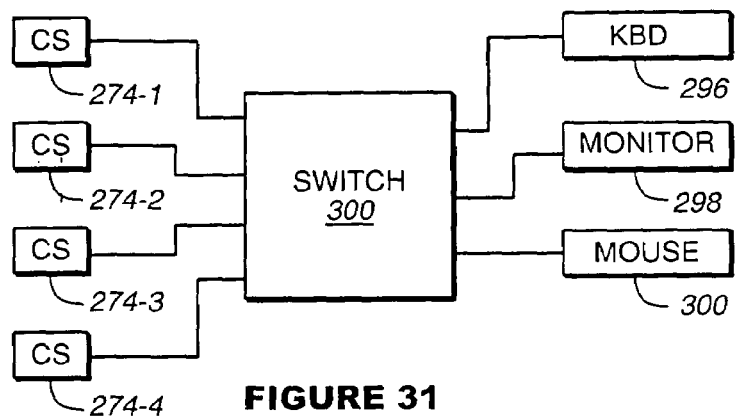
FIG. 31 shows a switch that can be used to selectively interconnect any of multiple computer systems with user interface components such as a keyboard, monitor or mouse.

Thus, the interconnections 300, 302 illustrated in FIG. 31 represent a 72 bit wide communication path among the first through fourth Level Three sub-systems. This communication path is somewhat analogous to the communication path described with reference to FIG. 15 and labeled 162. Both the communication path in FIG. 15 and the communication path in FIG. 33 permit the broadcast of information among components connected to them. In the case of the single communication and processing unit 120 shown in FIG. 15, the broadcast is among the processing elements of that single unit. In the case of the 72 bit wide communication path of FIG. 33, the communication is among the Level Three communication and processing sub-systems 114-9, 186, 188 and 190 that interconnect the various blocks 164, 178, 192 and 194 of the overall system.

Figure 21:
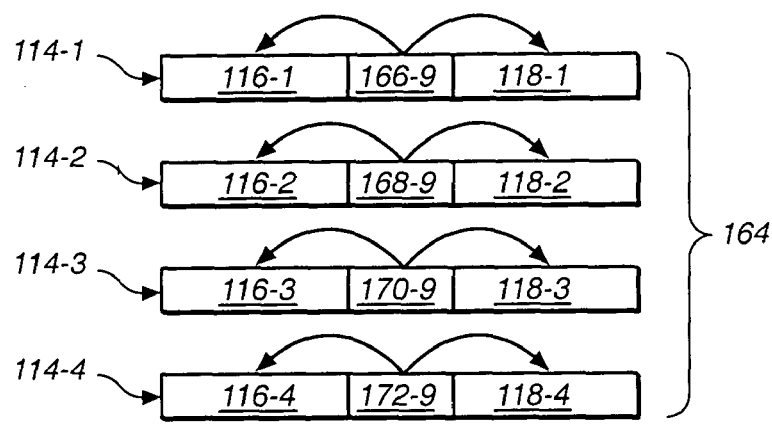
FIG. 21 shows in general terms the Level Two sub-systems of the first block 164; the arrows emanating in two directions from each of Level Two communication and processing units represent the bilateral symmetry of each of the Level Two sub-systems in accordance with a presently preferred embodiment of the invention.
Figure 22:
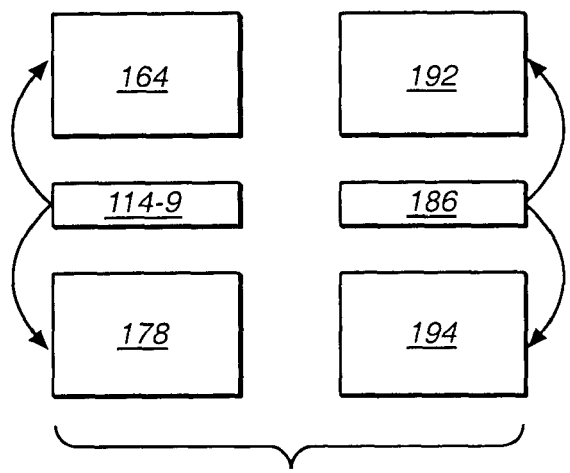
FIG. 22 shows in general terms the first through fourth blocks of Level Two sub-systems and shows the first and second Level Three communication and processing sub-systems; the two arrows emanating from each of sub-systems indicate the bilateral symmetry around these two sub-systems in accordance with a presently preferred embodiment of the invention.
Figure 23:
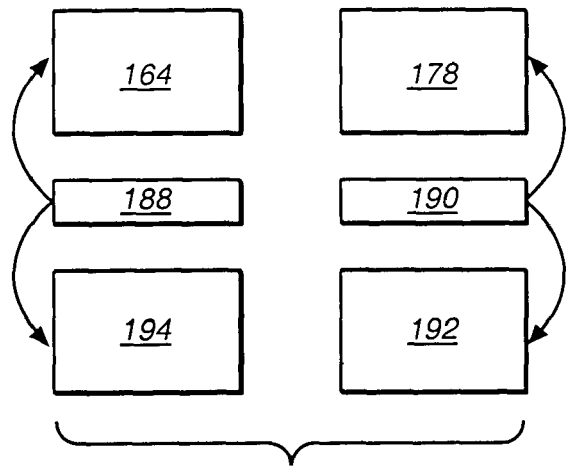
FIG. 23 shows the first through fourth blocks together with the third and fourth Level Three communication and processing sub-systems; the arrows emanating from sub-systems represent the symmetry of communications about these two sub-systems in accordance with a presently preferred embodiment of the invention.

FIGS. 21–23 explain in a conceptual fashion certain features of a present embodiment of the invention. FIG. 21 shows in general terms the Level Two sub-systems 114-1, through 114-4 of the first block 164. The arrows emanating in two directions from each of Level Two communication and processing units 166-9 through 172-9 represent the bilateral symmetry of each of the Level Two sub-systems 114-1 through 114-4. FIG. 22 shows in general terms the first through fourth blocks 164, 178, 192 and 194 of Level Two sub-systems and shows the first and second Level Three communication and processing sub-systems 114-9, 186. The two arrows emanating from each of sub-systems 114-9 and 186 indicate the bilateral symmetry around these two sub-systems. More specifically, the first Level Three communication and processing sub-system 114-9 provides a node for symmetry between the first and second blocks 164, 178, and the second Level Three communication and processing sub-system 186 provides a node for symmetry with respect to the third and fourth blocks 192, 194. FIG. 23 shows the first through fourth blocks 164, 178, 192 and 194 together with the third and fourth Level Three communication and processing sub-systems 188, 190. The arrows emanating from sub-systems 188 and 190 represent the symmetry of communications about these two sub-systems. More specifically, the third Level Three communication and processing sub-system 188 provides a node for symmetry of communications between the first block 164 and the fourth block 194, and the fourth Level Three communication and processing sub-system 190 provides a node for symmetry of communications between the second and third blocks 178 and 192.

Figure 24:
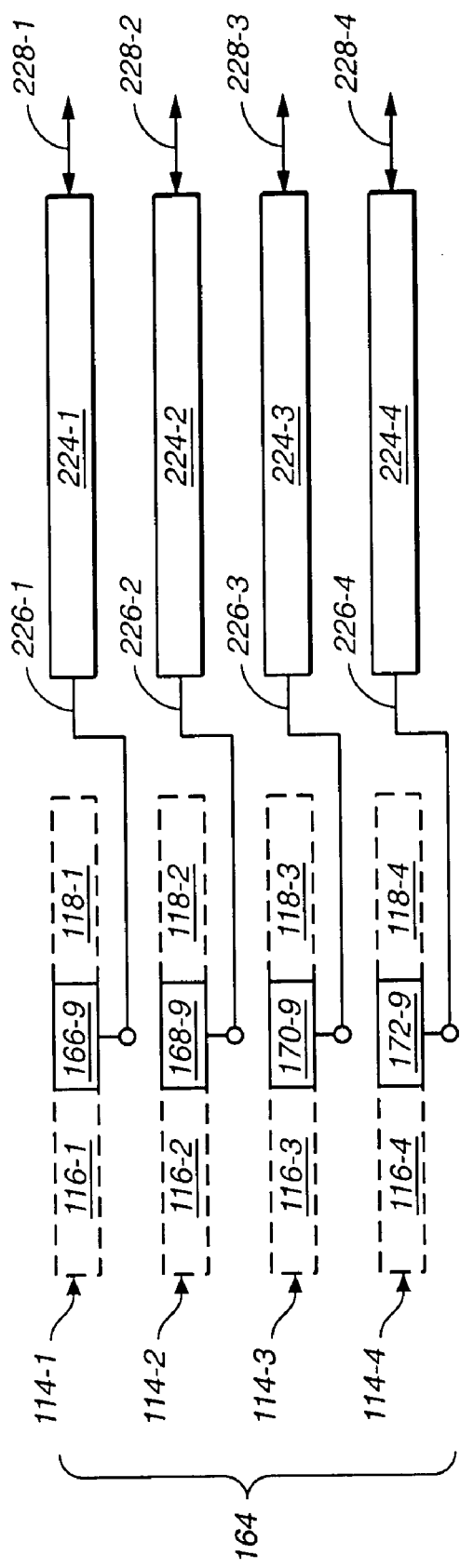
FIG. 24 is an illustrative drawing of the first block of Level Two subsystems; also, there is shown input/output (I/O) units; the respective Level Two subsystems interconnect with corresponding I/O units in accordance with a presently preferred embodiment of the invention.

In a presently preferred embodiment of the invention, respective Level Two subsystems, like subsystem 114 illustrated in FIGS. 12–14, are associated with respective input/output (I/O) systems. Respective Level Two subsystems can individually communicate with information systems external to the embodiment of the invention. Referring to the illustrative block diagram of FIG. 24, there is shown the first block 164 of Level Two subsystems 114-1 through 114-4. Also, there is shown input/output (I/O) units 224-1 through 224-4. The respective Level Two subsystems 114-1 through 114-4 interconnect with corresponding I/O units 224-1 through 224-4 via respective interconnection lines 226-1 through 226-4. More specifically, assuming that each Level Two subsystem 114-1 through 114-4 is similar to the subsystem described with reference to FIG. 14, then each such subsystem 114-1 through 114-4 interconnects with its corresponding interconnection lines 226-1 through 226-4 via respective external pins like the external pins labeled 160 in FIG. 14. Thus, the respective Level Two communication and processing units 166-9 through 172-9 interconnect with respective I/O units 224-1 through 224-4 via respective interconnection lines 226-1 through 226-4. The respective two-headed arrows labeled 228-1 through 228-4 indicate the possible external connections between respective I/O units 224-1 through 224-4 and external information systems (not shown).

Figure 25:
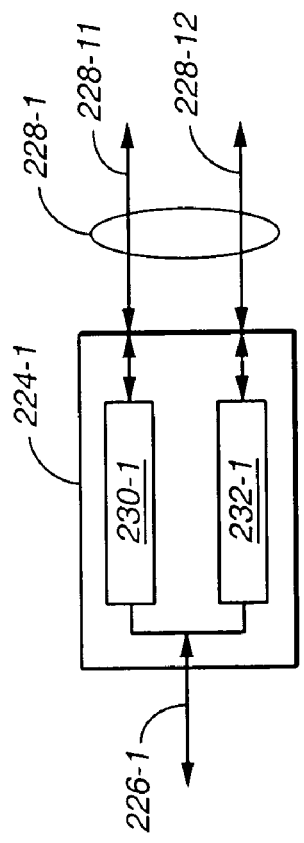
FIG. 25 is an illustrative block diagram providing additional details of a representative one of the I/O units; information carried by interconnection lines can communicate with an audio processing unit 230-1 or a video processing unit in accordance with a presently preferred embodiment of the invention.

Referring to the illustrative drawings of FIG. 25 there is shown a block diagram providing additional details of a representative one of the I/O units 224-1. Information carried by interconnection lines 226-1 can communicate with an audio processing unit 230-1 or a video processing unit 232-1. The audio processing unit 230-1 can communicate via external interconnection lines 228-11 with an external information system (not shown). The video processing unit 232-1 can communicate via external interconnection lines 228-12 with external information resources (not shown). It would be appreciated that external interconnection lines 228-11 and 228-12 are represented collectively as interconnection lines 228-1 in FIG. 24.

Figure 26:
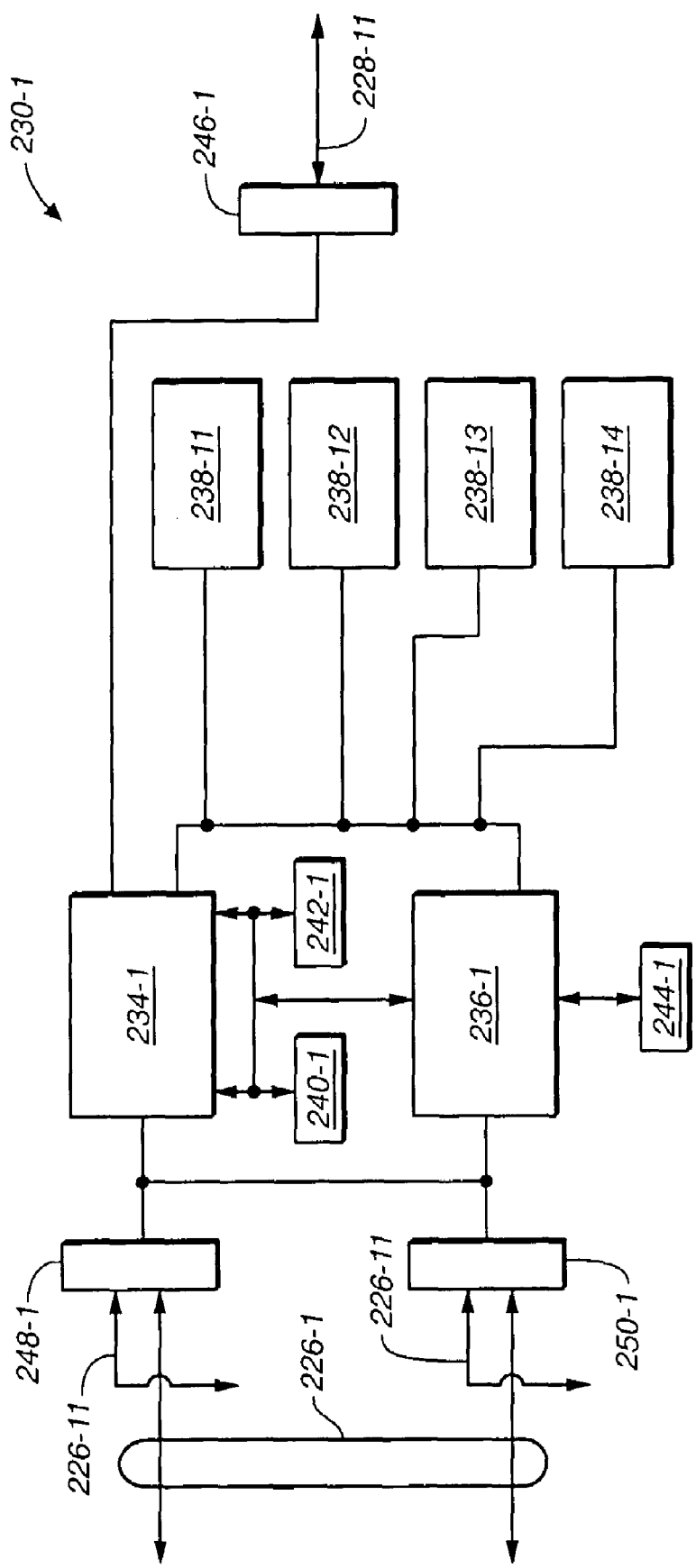
FIG. 26 provides additional details of the audio processing unit of FIG. 25.

Referring to the illustrative drawings of FIG. 26, there is shown a more detailed block diagram of the audio processing unit 230-1 of FIG. 25. Respective processing elements 234-1 and 236-1 each interconnect with CODECs 238-11 through 238-14. In a presently preferred embodiment of the invention, each of the processing elements 234-1 and 236-1 comprises a field programmable gate array. The processing element labeled 234-1 interconnects with memory resources 240-1 and 242-1. In a presently preferred embodiment of the invention, the memory resource labeled 240-1 includes a 32K SRAM, and the memory resource labeled 242-1 comprises a 2K SRAM. The processing element labeled 236-1 is interconnected with a memory resource 244-1. In a presently preferred embodiment of the invention, the memory resource labeled 244-1 includes a 1M SRAM. The processing element labeled 234-1 interconnects with a external connector 246-1 which provides interconnection with external interconnection lines 228-1. The processing element labeled 234-1 interconnects with external connector 248-1. The processing element labeled 236-1 interconnects with external connector 250-1. The external connector 248-1 provides interconnection with the interconnection lines 226-1 and lines 226-11 which interconnect with the video processing unit 232-1 as described more fully below. Similarly, the external connector 250-1 provides interconnection with interconnection lines 226-1, and provides interconnection with interconnection lines 226-11 which interconnect with the video processing unit 232-1 as further explained below.

In a presently preferred embodiment, the codex are dual channel stereo I/O 16 bit, 50 kilohertz devices. Specifically, they are CS4216 codex produced by Crystal Semiconductor, Dallas, Tex.

The processing elements 234-1 and 236-1 are implemented using Xilinx 3190 FPGAs. The FPGA 234-1 is implemented in a 160 pin package. The FPGA 236-1 is implemented in a 184 pin package. These processing elements are used, for example, to control the interface to the codex. For example, they may be used as I/O concentrators to provide a clock and parallel to serial conversion of information. Basically, the role of these processing elements is to process information provided to and received from the codex so that the codex can perform optimally.

It should be noted that external connection 246-1 can be used to input non-audio type information, even general digital data.

Figure 27:
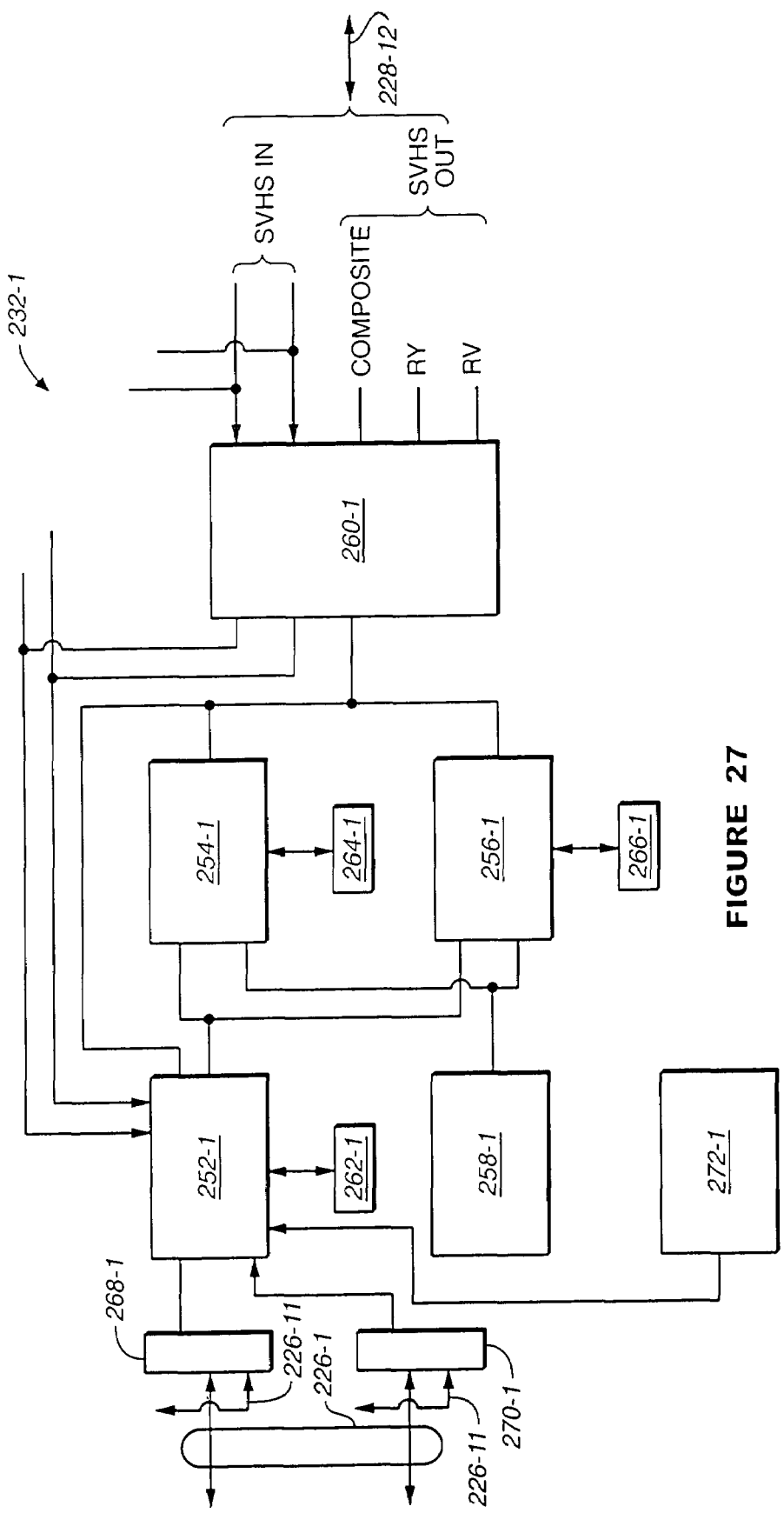
FIG. 27 provides additional details of the video processing unit of FIG. 25.

Referring to the illustrative drawings of FIG. 27 there is shown a more detailed block diagram of video processing unit 232-1. The unit includes processing elements 252-1 through 258-1. In a presently preferred embodiment of the invention processing elements 252-1 through 256-1 comprise field programmable gate arrays, and processing element 258-1 comprises a reconfigurable arithmetic path (RAD) of the type produced by "Infinite". A video processing unit 260-1 interconnects with external interconnection lines 228-12. The video processing unit 260-1 also interconnects with each of the processing elements 252-1 through 256-1. The respective processing elements 252-1 through 256-1 are interconnected with respective memory resources 262-1 through 266-1. The processing element labeled 252-1 interconnects with external connectors 268-1 and 270-1. The external connector 268-1 interconnects with a portion of the interconnections lines 226-1 and a portion of interconnections 226-11. The external connector 270-1 interconnects with a portion of interconnection lines 226-1 and a remaining portion of interconnection lines 226-11. A JPEG processor 272-1 the video processing unit is coupled to receive SVHS input signals and to provide SVHS output signals which comprise a composite, RY and RV components. The SVHS input signals are provided directly to the processing element labeled 252-1 in addition to being provided directly to the video processing unit 260-1.

In the presently preferred embodiment, the processing element 258-1 is implemented as a reconfigurable arithmetic device (RAD) produced by Infinite Technologies, Richardson, Tex. Basically, it provides four multipliers embedded in an FPGA core. It is an example of a variable granularity device. It is very useful for signal processing transformations in connection with video channel information. The processing 252-1 is implemented as a Xilinx 4010 FPGA. It serves as a task dispatcher and a communication device, a role similar to the role of the processing elements in the audio I/O system described with reference to FIG. 26. The processing elements 254-1, 256-1 implemented as Xilinx 4010 FPGAs. These FPGAs can perform functions such as, color space conversion video tweening and processor functions that prepare information for further processing by the RAD. The video processing 260-1 is implemented with integrated circuits produced by Phillips Semiconductor Corporation. Specifically, a 7191 device serves as a multistandard decoder. A 7199 device serves as a multistandard encoder. An 8708 devices serves as A to D converter. An 8709 device serves as an A to D converter. A 7191 device serves as a clock control unit to synchronize the chips and also includes three digital to analog converters. The processor 272-1 is a JPEG processor which can perform 8 by 8 array transforms and the JPEG compression algorithm.

Figure 28:
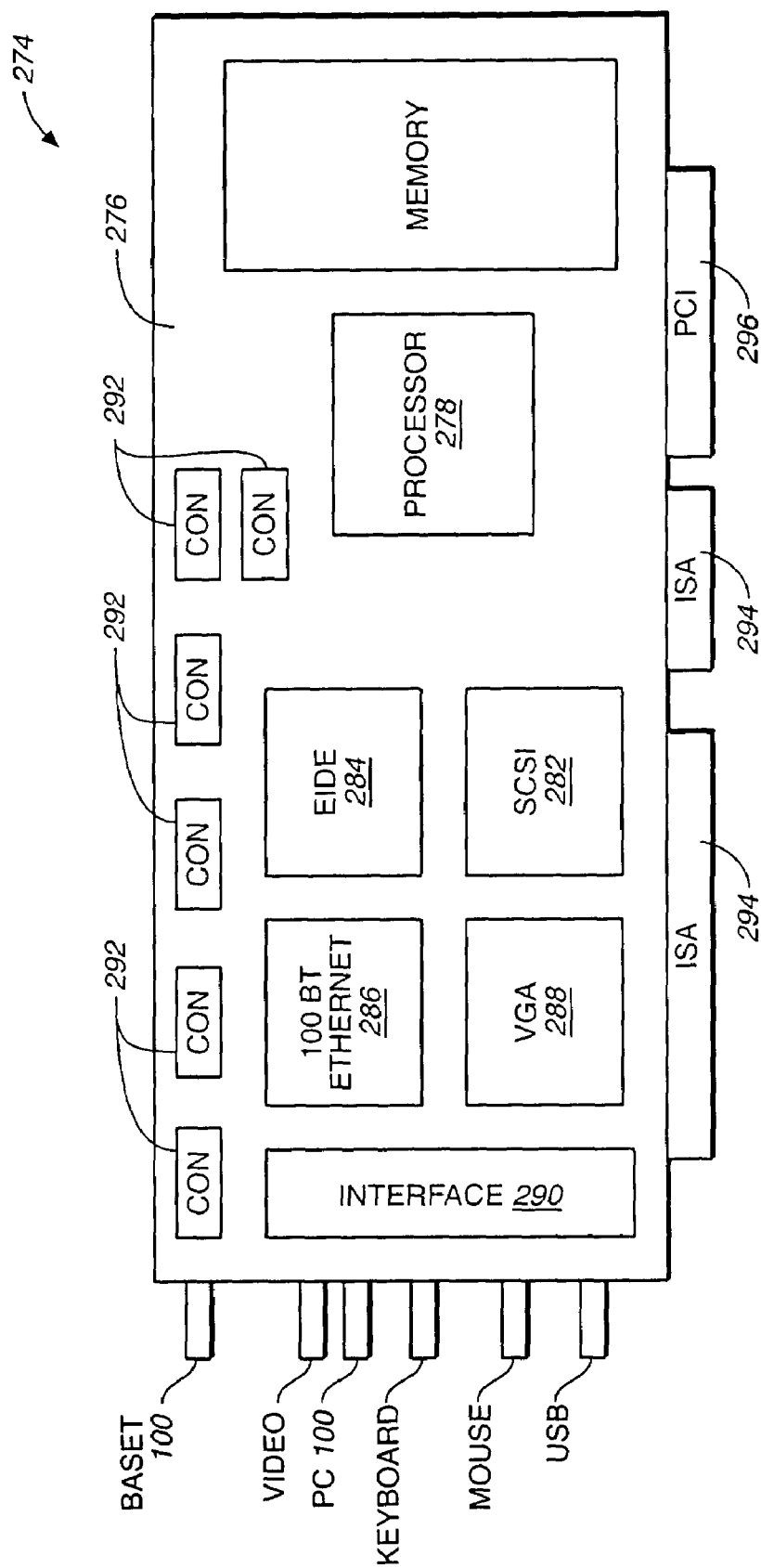
FIG. 28 is an illustrative block diagram of a computer system for use in a presently preferred embodiment of the invention.

Referring to the illustrative drawings of FIG. 28, there is shown a generalized block diagram of a computer system 274 for use in a presently preferred embodiment of the invention. The computer system 274 is constructed on a single board 276. In a presently preferred embodiment of the invention the board is a printed circuit board (PCB). The computer system includes a processor 278. In a present embodiment, the processor is a Pentium ®. The system also includes memory resources 280. In a presently preferred embodiment of the invention 256 M megabits of memory are provided. The system includes SCSI interface 282 and EIDE interface 284 and a 100BT Ethernet interface 286. The system 274 includes a video graphics array (VGA) controller 288. It also includes interface circuitry 290 suitable for use with external information signals such as 100 Base T video, keyboard, mouse and universal serial bus (USB) and a PC100 interface. The interface circuitry 290 may also provide for communication between the system 274 and other types of external information signals as well. Numerous external connectors 292 provide for direct interconnect with external circuits such as a SCSI system or an EIDE system, for example. Moreover, the system provides both ISI bus connections 294 and PCI bus connections 296. The computer system 274 is conventional in design, and the details of the interconnection between the various components described herein will be readily appreciated by those skilled in the art.

It will be appreciated that the computer system provides standard, conventional compute functionality. This is highly useful in making the overall system of the present invention readily accessible to persons who are familiar with a home or office computer, for example. From the perspective of the computer system, the entire reconfigurable array with its numerous blocks such as the first through fourth blocks 164, 178, 192 and 194, may appear as a massive co-processor available through the computer system.

From another perspective, the computer system may be viewed, from the perspective of the overall system as an extremely coarse grained processor. It may be perceived from the view of the array as a processor which operates on many bits of data and many bits of instructions at a time.

It will be appreciated that in future generations of this system, the role of the computer system may be less and less important. However, it provides a useful interface from the perspective of the user, and from the perspective of the system it provides a unique processor.

Referring to the illustrative drawings of FIG. 29, there is shown a generalized view of the layout of the board level components of a presently preferred embodiment of the invention. It will be appreciated that in a current implementation, each level two subsystem, each I/O unit and each computer system is implemented in a separate board. Specifically, in the present embodiment each such complement is implemented with its own printed circuit board (PCB). The drawings of FIG. 29, show, in general terms, the arrangement of these various boards.

More particularly, the first through fourth blocks 164, 178, 192 and 194 of Level Two subsystems are shown together with the respective Level Two subsystems that serve as first through fourth Level Three communications and processing subsystems 114-9, 186, 188 and 190. In addition, first through fourth computer systems 274-1 through 274-4 are shown. Level Two subsystems (L2S) 114-1 through 114-4 are respectively interconnected with their corresponding I/O units 224-1 through 224-4 by respective interconnection lines 226-1 through 226-4. Moreover, respective I/O units 224-1 through 224-4 provide respective external interconnections 228-1 through 228-4. Respective Level Three communications and processing subsystem 114-9 and computer system 274-1 are disposed adjacent to one another and adjacent to the Level Two subsystems and corresponding I/O units of the first block 164 as shown.

Referring to the second block 178, respective Level Two subsystems 114-5 through 114-8 interconnect with corresponding respective I/O units 276-1 through 276-4 via respective interconnection lines 278-1 through 278-1. Respective I/O units 276-1 through 276-4 provide external interconnections 280-1 through 280-4.

Referring to the third block 192, respective Level Two subsystems 216-1 through 216-4 are interconnected with corresponding I/O units 282-1 through 282-4 via respective interconnection lines 284-1 through 284-4. Respective I/O units 282-1 through 282-4 provide external connections 286-1 through 286-4.

Referring to block 194, respective Level Two subsystems 208-1 through 208-4 are respectively interconnected with corresponding I/O units 288-1 through 288-4 via respective interconnection lines 290-1 through 290-4. Respective I/O units 288-1 through 288-4 provide external connection lines 292-1 through 292-4.

Figure 30:
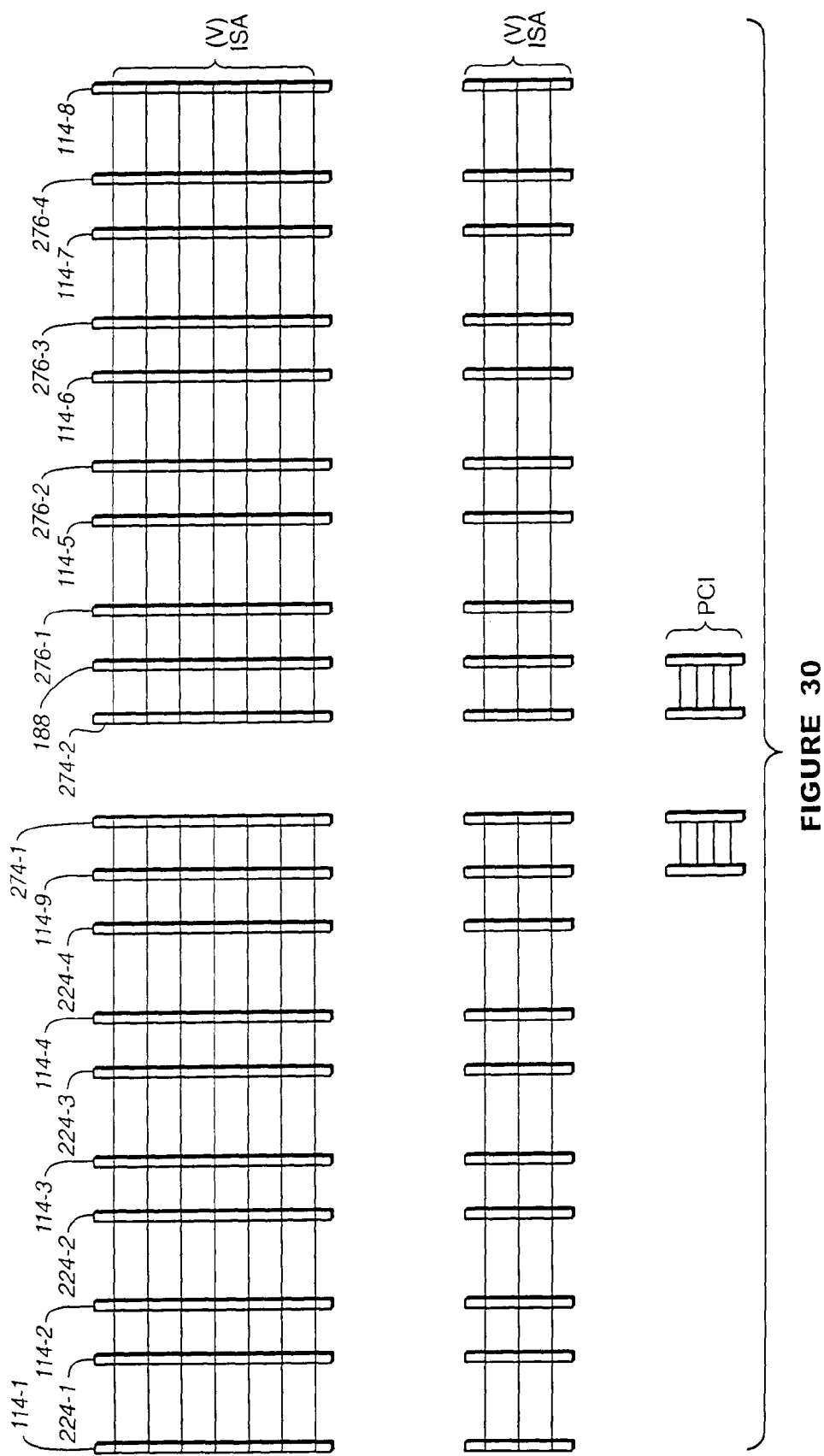
FIG. 30 shows in general terms the (V)ISA and PCI interconnections provided by a back plane board in accordance with a presently preferred embodiment of the invention.

Referring to the illustrative drawings of FIG. 30 there is shown in general terms the (V)ISA and PCI interconnections provided by a back plane board in accordance with a presently preferred embodiment of the invention. More specifically, the illustrative drawings of FIG. 30 show (V)ISA lines for the first and second blocks 164, 178 which include Level Two subsystems 114-1 through 114-8, 114-9 and 188, and which include I/O units 224-1 through 224-4 and 276-1 through 276-4 and computer systems 274-1 and 274-2. It will be noted that each of the aforementioned components are interconnected by the (V)ISA lines, but only the Level Two systems that serve as Level Three communications and processing sub-systems 114-9 and 188 are interconnected with PCI lines.

Referring to the illustrative drawing of FIG. 31 there is shown a switch 294 that can be used to selectively interconnect any of the computer systems 274-1 through 274-4 with user interface components such as a keyboard 296, monitor 298 or mouse 300. The switch, for example, can be a multi-pole, multi-throw switch. A user can easily directly access any of the computer systems 271 through 274 through the user interface components via the switch 294.

Figure 32:
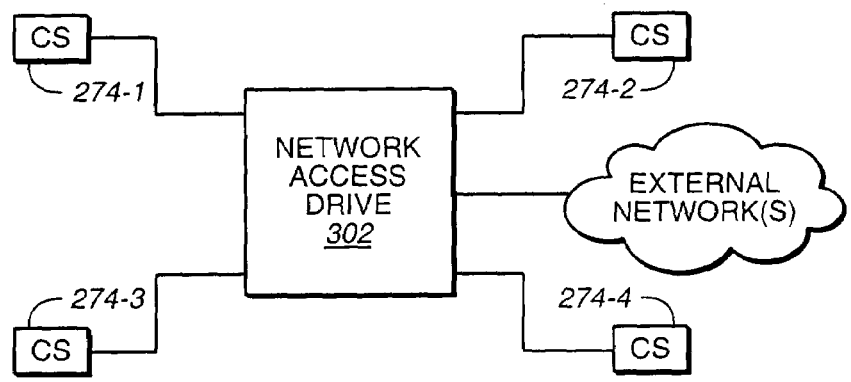
FIG. 32 shows a network access device, such as an ethernet hub, interconnected with each of the computer systems and external networks indicated by a cloud; these external networks, for example, might include the Internet.

Referring to the illustrative drawing of FIG. 32 there is shown a network access device 302, such as an ethernet hub, interconnected with each of the computer systems 271 through 274 and external networks indicated by a cloud. These external networks, for example, might include the Internet. Each of the computer systems 274-1 may communicate with external networks through such a network access device.

It will be understood that the foregoing description and drawings of preferred embodiment in accordance with the present invention are merely illustrative of the principles of this invention, and that various modifications can be made by those skilled in the art without departing from the scope and spirit of the invention.

The invention claimed is:

1. A computer system comprising:
a plurality of first subsystems; and
a second subsystem;
wherein each first subsystem includes multiple processing elements intra-connected to permit communication within such first subsystem among the processing elements;
wherein each first subsystem includes at least one processing element that is coupled as a respective communication and processing unit for such respective first subsystem which permits communication among the multiple processing elements of such first subsystem and processing elements of another first subsystem coupled to serve as a communication and processing unit for the second subsystem; and
wherein the second subsystem includes the plurality of first subsystems; and
wherein multiple processing elements of the another first subsystem that is coupled to serve as a communication and processing unit for such second subsystem are coupled to permit communication among the at least one processing elements of the multiple respective first subsystems that are coupled to serve as communication and processing units for their respective first subsystems.

2. The computer system of claim 1,
wherein there is a first proportionality between a number of processing elements in each of the multiple first subsystems to a number of processing elements in the first subsystems that are coupled to serve as a communication and processing units; and
wherein there is a second proportionality between a number of first subsystems in the second subsystem and a number of first subsystems that are coupled to serve as a communication and processing units; and
wherein the first proportionality substantially equals the second proportionality.

3. The computer system of claim 1,
first and second second subsystems; and
a third subsystem;
wherein the third subsystem includes the first and second second subsystems, and at least two additional first subsystems that are coupled to serve as communication and processing units for such third subsystem; and
wherein multiple respective processing elements of the at least two additional first subsystems are coupled to permit communication among multiple respective at least one processing elements of multiple respective first subsystems of the first and second second subsystems that are coupled to serve as communication and processing units for their respective first subsystems.

4. The computer system of claim 1,
wherein there is a first proportionality between a number of processing elements in each of the multiple first subsystems to a number of processing elements in the first subsystems that are coupled to serve as a communication and processing units; and
wherein there is a second proportionality between a number of first subsystems in the second subsystem and a number of first subsystems that are coupled to serve as a communication and processing units;
wherein there is a third proportionality between a number of first subsystems in the third subsystem and a number of first subsystems that are coupled to serve as communication and processing units; and
wherein the first, second and third proportionalities are substantially equal to each other.

5. The computer system of claim 1,
wherein each processing element includes a field programmable logic array.

6. The computer system of claim 1,
wherein each processing element includes a field programmable logic array (FPGA); and
wherein a plurality of the FPGAs include associated memory modules.

7. A computer system comprising:
a plurality of first subsystems;
wherein each of the plurality of first subsystems includes multiple processing elements intra-connected to permit communication among the respective processing elements within such at least one network of processing elements; and further including,
first, second, third and fourth blocks of first subsystems;
wherein the first subsystems of the first block are intra-connected to permit intra-communication among the first subsystems within the first block;
wherein the first subsystems of the second block are intra-connected to permit intra-communication among the first subsystems within the second block;
wherein the first subsystems of the third block are intra-connected to permit intra-communication among the first subsystems within the third block; and
wherein the first subsystems of the fourth block are intra-connected to permit intra-communication among the first subsystems within the fourth block; and further including,
a first first subsystem that is coupled to serve as a communication and processing unit for inter-communication between respective first subsystems of the first block and respective first subsystems of the second block;
a second first subsystem that is coupled to serve as a communication and processing unit for inter-communication between respective first subsystems of the first block and respective first subsystems of the third block;
a third first subsystem that is coupled to serve as a communication and processing unit for inter-communication between respective first subsystems of the second block and respective first subsystems of the third block; and
a fourth first subsystem that is coupled to serve as a communication and processing unit for inter-communication between respective first subsystems of the third block and respective first subsystems of the fourth block.

8. The computer system of claim 7, wherein at least one processing element of each of multiple respective first subsystems of the first block is coupled to serve as a communication and processing unit for its respective first subsystem so as to permit communication among the multiple processing elements of its respective first subsystem and processing elements of the first first subsystem that is coupled to serve as a communication and processing unit for inter-communication between respective first subsystems of the first block and respective subsystems of the second block;

wherein at least one processing element of each of multiple respective first subsystems of the second block is coupled to serve as a communication and processing unit for its respective first subsystem so as to permit communication among the multiple processing elements of its respective first subsystem and processing elements of the first first subsystem that is coupled to serve as a communication and processing unit for inter-communication between respective first subsystems of the first block and respective subsystems of the second block;

wherein at least one processing element of each of multiple respective first subsystems the third block is coupled to serve as a communication and processing unit for its respective first subsystem so as to permit communication among the multiple processing elements of its respective first subsystem and processing elements of the second first subsystem that is coupled to save as a communication and processing unit for inter-communication between respective first subsystems of the third block and respective subsystems of the fourth block;

wherein at least one processing element of each of multiple respective first subsystems of the fourth block is coupled to save as a communication and processing unit for its respective first subsystem so as to permit communication among the multiple processing elements of its respective first subsystem and processing elements of the second first subsystem that is coupled to serve as a communication and processing unit for inter-communication between respective first subsystems of the third block and respective subsystems of the fourth block;

wherein at least one processing element of each of multiple respective first subsystems of the first block is coupled to serve as a communication and processing unit its respective first subsystem so as to permit communication among the multiple processing elements of its respective first subsystem and processing elements of the third first subsystem that is coupled to serve as a communication and processing unit for inter-communication between respective first subsystems of the first block and respective subsystems of the fourth block;

wherein at least one processing element of each of multiple respective first subsystems of the fourth block is coupled to serve as a communication and processing unit for its respective first subsystem so as to permit communication among the multiple processing elements of its respective first subsystem and processing elements of the third first subsystem that is coupled to serve as a communication and processing unit for inter-communication between respective first subsystems of the first block and respective subsystems of the fourth block;

wherein at least one processing element of each of multiple respective first subsystems of the second block is coupled to serve as a communication and processing unit for its respective first subsystem so as to permit communication among the multiple processing elements of its respective first subsystem and processing elements of the fourth first subsystem that is coupled to serve as a communication and processing limit for inter-communication between respective first subsystems of the second block and respective subsystems of the third block; and wherein at least one processing element of each of multiple respective first subsystems of the third block is coupled to serve as a communication and processing unit for its respective first subsystem so as to permit communication among the multiple processing elements of its respective first subsystem and processing elements of the fourth first subsystem that is coupled to serve as a communication and processing unit for inter-communication between respective first subsystems of the second block and respective subsystems of the third block.

9. The computer system of claim 7, wherein each processing element includes a field programmable logic array.

10. The computer system of claim 7, wherein each processing element includes a field programmable logic array (FPGA); and wherein a plurality of the FPGAs include associated memory modules.

* * * * *